United States Patent
Isono et al.

(10) Patent No.: US 8,652,660 B2
(45) Date of Patent: *Feb. 18, 2014

(54) GLASS SUBSTRATE FOR MAGNETIC RECORDING MEDIUM AND ITS USE

(75) Inventors: Hideki Isono, Shinjuku-ku (JP); Kinobu Osakabe, Shinjuku-ku (JP); Katsuyuki Iwata, Shinjuku-ku (JP); Mikio Ikenishi, Shinjuku-ku (JP); Naomi Matsumoto, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/331,667

(22) Filed: Dec. 20, 2011

(65) Prior Publication Data

US 2012/0188663 A1 Jul. 26, 2012

Related U.S. Application Data

(60) Provisional application No. 61/425,537, filed on Dec. 21, 2010.

(51) Int. Cl.
*C03C 3/00* (2006.01)
*G11B 5/02* (2006.01)
*G11B 5/65* (2006.01)

(52) U.S. Cl.
USPC ............................ 428/846.9; 360/135; 501/70

(58) Field of Classification Search
USPC .............. 428/846.9, 141, 410, 848; 65/30.14; 501/64, 67, 68, 66, 69, 70, 72, 10; 438/769; 73/783, 794, 806, 862.07; 360/133, 135, 136
See application file for complete search history.

(56) References Cited

U.S. PATENT DOCUMENTS

| | | | |
|---|---|---|---|
| 6,376,084 B1 | 4/2002 | Kishimoto et al. | |
| 2005/0209086 A1* | 9/2005 | Sugawara et al. | 501/69 |
| 2008/0020919 A1* | 1/2008 | Murata | 501/66 |
| 2008/0053152 A1 | 3/2008 | Kurachi et al. | |
| 2008/0248316 A1 | 10/2008 | Goto et al. | |
| 2009/0239102 A1* | 9/2009 | Nagashima et al. | 428/846.9 |
| 2010/0160141 A1* | 6/2010 | Ikenishi et al. | 501/67 |
| 2010/0167091 A1 | 7/2010 | Tachiwana et al. | |
| 2010/0255350 A1* | 10/2010 | Endo et al. | 501/69 |

FOREIGN PATENT DOCUMENTS

| | | |
|---|---|---|
| JP | 2000313634 A | 11/2000 |
| JP | 2004043295 A | 2/2004 |
| JP | 2005-302289 | * 10/2005 |
| JP | 2005302289 A | 10/2005 |
| JP | 2007200467 A | 8/2007 |
| JP | 2007257747 A | 10/2007 |
| JP | 2008254984 A | 10/2008 |
| JP | 2011253575 A | 12/2011 |
| WO | 2007142324 A1 | 12/2007 |

OTHER PUBLICATIONS

JP 2005-302289, Hoya, Machine Translation, Oct. 2005.*
International Search Report and Written Opinion corresponding to PCT application No. PCT/JP2011/079585, dated Feb. 7, 2012.
International Preliminary Report on Patentability issued in the corresponding International Application No. PCT/JP2011/079585 with English translation.

* cited by examiner

*Primary Examiner* — Kevin M. Bernatz
*Assistant Examiner* — Louis Falasco
(74) *Attorney, Agent, or Firm* — Sughrue Mion, PLLC

(57) ABSTRACT

An aspect of the present invention relates to a glass substrate for a magnetic recording medium, which is comprised of glass with a glass transition temperature of equal to or greater than 600° C., an average coefficient of linear expansion at 100 to 300° C. of equal to or greater than $70 \times 10^{-7}$/° C., a Young's modulus of equal to or greater than 81 GPa, a specific modulus of elasticity of equal to or greater than 30 MNm/kg, and a fracture toughness value of equal to or greater than 0.9 MPa·m$^{1/2}$.

25 Claims, No Drawings

GLASS SUBSTRATE FOR MAGNETIC RECORDING MEDIUM AND ITS USE

CROSS-REFERENCE TO RELATED APPLICATIONS

This application claims the benefit of priority under 35 USC 119 to U.S. Patent Application No. 61/425,537 filed on Dec. 21, 2010, which is expressly incorporated herein by reference in its entirety.

BACKGROUND OF THE INVENTION

1. Field of the Invention

The present invention relates to a glass substrate employed as a substrate in magnetic recording media such as hard disks, a glass substrate blank for a magnetic recording medium, a magnetic recording medium comprising the above substrate, and a method of manufacturing the same, as well as a magnetic recording apparatus.

2. Discussion of the Background

With the development of information-related infrastructure such as the Internet, the need for information recording media such as magnetic disks and optical disks has increased sharply. The main structural components of the magnetic memory apparatuses of computers and the like are magnetic recording media and magnetic heads for magnetic recording and reproduction. Known magnetic recording media include flexible disks and hard disks. Of these, examples of the substrate materials employed in hard disks (magnetic disks) include aluminum substrates, glass substrates, ceramic substrates, and carbon substrates. In practical terms, depending on size and application, aluminum substrates and glass substrates are primarily employed. In the hard disk drives of laptop computers, in addition to impact resistance and higher density recording of magnetic recording media, the requirement of increased surface smoothness of the disk substrate is intensifying. Thus, there are limits to how well aluminum substrates, with afford poor surface hardness and rigidity, can respond. Accordingly, the development of glass substrates is currently the mainstream (for example, see Document 1 (Published Japanese Translation of a PCT international publication for patent application (TOKUHYO) No. Heisei 9-507206), Document 2 (Japanese Unexamined Patent Publication (KOKAI) No. 2007-51064), Document 3 (Japanese Unexamined Patent Publication (KOKAI) No. 2001-294441), Document 4 (Japanese Unexamined Patent Publication (KOKAI) No. 2001-134925), Document 5 (Japanese Unexamined Patent Publication (KOKAI) No. 2001-348246), Document 6 (Japanese Unexamined Patent Publication (KOKAI) No. 2001-58843), Document 7 (Japanese Unexamined Patent Publication (KOKAI) No. 2006-327935), Document 8 (Japanese Unexamined Patent Publication (KOKAI) No. 2005-272212), or English language family members US 2005/215414A1 and U.S. Pat. No. 7,687,419, Document 9 (Japanese Unexamined Patent Publication (KOKAI) No. 2004-43295), Document 10 (Japanese Unexamined Patent Publication (KOKAI) No. 2005-314159), or English language family members US 2005/244656A1 and U.S. Pat. No. 7,595,273; which are expressly incorporated herein by reference in their entirety).

In recent years, with the goal of achieving even higher density recording in magnetic recording media, the use of magnetic materials of high magneto-anisotropic energy (magnetic materials of value), such as Fe—Pt and Co—Pt based materials, is being examined (for example, see Document 11 (Japanese Unexamined Patent Publication (KOKAI) No. 2004-362746) or English language family members US 2004/229006A1 and U.S. Pat. No. 7,189,438; which is expressly incorporated herein by reference in its entirety). It is necessary to reduce the particle diameter of the magnetic particles to achieve higher density recording. However, when just the particle diameter is reduced, the deterioration of magnetic characteristics due to thermal fluctuation becomes a problem. Magnetic materials of high Ku value tend not to be affected by thermal fluctuation, and are thus expected to contribute to the achievement of greater recording density.

However, the above-described magnetic materials of high Ku value must be in a specific state of crystal orientation to exhibit a high Ku value. Thus, a film must be formed at high temperature or thermoprocessing must be conducted at high temperature following film formation. Accordingly, the formation of a magnetic recording layer comprised of such magnetic materials of high Ku value requires that a glass substrate have high heat resistance that is capable of withstanding the above-described processing at high temperatures, that is, have a high glass transition temperature.

By the way, in disk-shaped magnetic recording media, data are written and read in the direction of rotation by radially displacing a magnetic head while rotating the medium at high speed about a center axis. In recent years, the rotational speed has been increased from 5,400 rpm to 7,200 rpm, and up to a high speed of 10,000 rpm to increase the writing rate and reading rate. However, in disk-shaped magnetic recording media, since the positions at which data are recorded are assigned in advance based on the distance from the center axis, when the disk deforms during rotation, the magnetic head develops a positional displacement, compromising proper reading. Accordingly, to cope with higher rotational speeds described above, the glass substrate is required to have high rigidity (Young's modulus) so as to prevent substantial deformation during high-speed rotation.

Furthermore, the use of a glass substrate with a high coefficient of thermal expansion permits an increase in the reliability of recording and reproduction with magnetic recording media for the following reasons.

HDDs (hard disk drives), in which magnetic recording media are loaded, are configured such that the spindle of a spindle motor presses against the center portion, causing the magnetic recording medium itself to rotate. Thus, when there is a substantial difference in the coefficient of thermal expansion of the substrate of the magnetic recording medium and spindle material constituting the spindle portion, a discrepancy ends up developing between the thermal expansion and contraction of the spindle and those of the substrate of the magnetic recording medium in response to change in the surrounding temperature during use. As a result, the phenomenon in which the magnetic recording medium ends up changing shape occurs. When such phenomenon occurs, information that has been written cannot be read by a head, compromising recording and reproduction reliability. Accordingly, enhancing the reliability of magnetic recording media requires that glass substrates have high coefficient of thermal expansion similar to that of the spindle material (such as stainless steel).

As set forth above, it is required for a glass substrate to have the characteristics of high heat resistance, high rigidity, and a high coefficient of thermal expansion to provide a magnetic recording medium capable of handling higher recording densities. However, there is a trade-off between these characteristics, making it difficult to achieve a glass substrate satisfying all.

Additionally, in recent years, to enhance the reliability of HDDs, good impact resistance has come to be demanded of the glass substrates employed in magnetic recording media of which extremely high recording densities are required. This has included energy-assisted magnetic recording media, the investigation of which is advancing.

As a first example, given this background, the flying height of the magnetic head (the gap between the magnetic head and the surface of the magnetic recording medium) has greatly decreased (flying height reduction). As that has occurred, the distance between the recording head and the magnetic layer of the medium has decreased, making it possible to pick up the signals of smaller magnetic particles, and permitting in turn even higher recording densities. In recent years, to achieve greater flying height reduction than in the past, a function known as dynamic flying height (DFH) has been imparted to magnetic heads. It is a function whereby a heating element such as an extremely small heater is disposed in the vicinity of the recording and reproduction elements of the magnetic head, with just the area around the elements protruding toward the surface of the medium. In the future, based on this function, it is thought that the gap between the elements of the magnetic head and surface of the medium will decrease to less than 2 nm. Thus, even a slight shock will tend to cause the magnetic head to collide with the surface of the medium.

A second example is rapid rotation of the medium. That causes collisions with the magnetic head to increase when undergoing a shock. Since there is substantial deflection of the substrate at its outer perimeter, even a slight shock tends to cause a collision with the magnetic head. Due to the effects of fastening (securing) the medium with a spindle and clamps, there is a substantial possibility of the substrate cracking along the inner circumference portion when the HDD itself is subjected to an external shock.

SUMMARY OF THE INVENTION

An aspect of the present invention provides for a glass substrate for a magnetic recording medium with high heat resistance, high rigidity, a high coefficient of thermal expansion, and good impact resistance, as well as a magnetic recording medium employing the above substrate.

The present inventors conducted extensive research in an attempt to achieve a glass substrate with good impact resistance. As a result, they discovered that it is effective to increase a fracture toughness of a glass substrate to improve durability in contacting with a magnetic head. In addition, they also discovered that it is effective to increase a Young's modulus and a specific modulus of elasticity to provide a light glass substrate with high rigidity, to suppress deflection of the substrate at its outer perimeter in rapid rotation. That is, they discovered that, in order to achieve good impact resistance, it is highly effective to satisfy all of a high fracture toughness, a high Young's modulus and a specific modulus of elasticity.

The present invention was devised on that basis.

That is, an aspect of the present invention relates to a glass substrate for a magnetic recording medium, which is comprised of glass with a glass transition temperature of equal to or greater than 600° C., an average coefficient of linear expansion at 100 to 300° C. of equal to or greater than $70 \times 10^{-7}/°$ C., a Young's modulus of equal to or greater than 81 GPa, a specific modulus of elasticity of equal to or greater than 30 MNm/kg, and a fracture toughness value of equal to or greater than 0.9 MPa·m$^{1/2}$.

The glass substrate for a magnetic recording medium may have a sheet thickness of equal to or greater than 0.8 mm.

The glass substrate for a magnetic recording medium may be a glass substrate for a magnetic recording medium employed in a magnetic recording apparatus in which a rotational speed is equal to or higher than 7200 rpm.

The content of $K_2O$ in the glass may be less than 3 mole percent.

The glass may have been subjected to chemical strengthening.

The chemical strengthening may have been conducted with the use of melt of potassium nitrate and/or sodium nitrate.

The glass substrate for a magnetic recording medium may be a glass substrate for a magnetic recording medium employed in a magnetic recording apparatus equipped with a DFH (dynamic flying height) head.

The glass substrate for a magnetic recording medium may be employed in a magnetic recording medium for energy-assisted magnetic recording.

In the glass substrate for a magnetic recording medium according to claim 1, the arithmetic average roughness, Ra, measured by an atomic force microscope at a resolution of 512×256 pixels over an area of 1 μm×1 μm on a main surface of the substrate may be equal to or lower than 0.15 nm.

A further aspect of the present invention relates to a method of manufacturing a glass substrate for a magnetic recording medium, which comprises steps of:

polishing a glass material with a fracture toughness value of less than 1.3 MPa·m$^{1/2}$, conducting chemical strengthening after the polishing, to manufacture the above glass substrate for a magnetic recording medium.

The method of manufacturing a glass substrate for a magnetic recording medium may comprise a chemical strengthening step. The chemical strengthening step may be a step of rendering a ratio of a fracture toughness value $K_{1c}$ (after) of the glass material following chemical strengthening to a fracture strength $K_{1c}$ (before) of the glass material before the chemical strengthening, $K_{1c}$ (after)/$K_{1c}$ (before), being equal to or greater than 1.5.

A still further aspect of the present invention relates to a magnetic recording medium, which comprises a magnetic recording layer on the above glass substrate for a magnetic recording medium. The magnetic recording layer may comprise a magnetic material the main component of which is alloy of Pt with Fe and/or Co, and the magnetic recording medium may be a magnetic recording medium for energy-assisted magnetic recording.

A still further aspect of the present invention relates to a method of manufacturing a magnetic recording medium, which comprises forming a film of a magnetic material the main component of which is alloy of Pt with Fe and/or Co on a main surface of the above glass substrate, after which conducting annealing, to form a magnetic recording layer.

A still further aspect of the present invention relates to a magnetic recording apparatus of energy-assisted magnetic recording system, which comprises a heat-assisted magnetic recording head comprising a heat source heating at least a main surface of a magnetic recording medium, a recording element, and a reproduction element; and the above magnetic recording medium.

A still further aspect of the present invention relates to a glass substrate blank for a magnetic recording medium, which is comprised of glass with a glass transition temperature of equal to or greater than 600° C., an average coefficient of linear expansion at 100 to 300° C. of equal to or greater than $70 \times 10^{-7}/°$ C., a Young's modulus of equal to or greater than 81 GPa, a specific modulus of elasticity of equal to or greater than 30 MNm/kg, and a fracture toughness value of equal to or greater than 0.9 MPa·m$^{1/2}$. The above glass substrate for a magnetic recording medium can be obtained by subjecting the glass substrate blank to processing such as grinding, polishing, and the like.

The present invention can provide a glass substrate having high heat resistance capable of resisting high-temperature heat treatment in forming a magnetic recording layer comprised of a high Ku magnetic material, good impact resistance due to high fracture toughness provided by chemical strengthening, a high coefficient of thermal expansion matching that of the support member (spindle), and high rigidity capable of resisting high-speed rotation, as well as a magnetic recording medium equipped with the above glass substrate.

DETAILED DESCRIPTION OF THE EMBODIMENTS

Glass Substrate for a Magnetic Recording Medium

The glass substrate for a magnetic recording medium of the present invention is comprised of glass with a glass transition temperature of equal to or greater than 600° C., an average coefficient of linear expansion at 100 to 300° C. of equal to or greater than $70 \times 10^{-7}$/° C., a Young's modulus of equal to or greater than 81 GPa, a specific modulus of elasticity of equal to or greater than 30.0 MNm/kg, and a fracture toughness value of equal to or greater than 0.9 MPa·m$^{1/2}$.

The present invention further relates to a glass substrate blank for a magnetic recording medium suited to use in providing the glass substrate of the present invention described above.

The present invention can provide a glass substrate suited to magnetic recording media corresponding to the high recording densities typical of energy-assisted type magnetic recording media by employing glass of good impact resistance having high fracture toughness along with a balanced high heat resistance, high rigidity, and high thermal expansion although there would be a trade-off between these characteristics.

The various characteristics of the glass substrate of the present invention will be described next. Unless specifically stated otherwise, the various characteristics given below refer to the values following chemical strengthening in chemically strengthened glass substrates.

1. Glass Transition Temperature

When attempting to increase the recording density of a magnetic recording medium by incorporating a magnetic material of high Ku or the like as set forth above, the glass substrate for a magnetic recording medium is exposed to high temperatures during high temperature processing of the magnetic material. In this process, to prevent loss of the extremely high degree of flatness of the substrate, good heat resistance is demanded of the glass substrate for a magnetic recording medium. The glass transition temperature is employed as an index of heat resistance. The glass substrate of the present invention has a glass transition temperature of equal to or higher than 600° C., making it possible to maintain good flatness following high temperature processing. Accordingly, the glass substrate of the present invention is suited to the preparation of a magnetic recording medium comprising a magnetic material of high Ku. The glass transition temperature desirably falls within a range of equal to or higher than 610° C., preferably within a range of equal to or higher than 620° C., more preferably within a range of equal to or higher than 630° C. The upper limit of the glass transition temperature is, for example, about 750° C., but is not specifically limited because higher glass transition temperature is preferred.

2. Coefficient of Thermal Expansion

As set forth above, when there is a large difference in coefficient of thermal expansion between the glass constituting the glass substrate for a magnetic recording medium and the spindle material (such as stainless steel) of an HDD, changes in temperature during the operation of the HDD cause the magnetic recording medium to deform, problems occur in recording and reproduction, and reliability ends up being compromised. In particular, in magnetic recording media having a magnetic recording layer comprised of a magnetic material of high Ku, the recording density is extremely high. Thus, even slight deformation of the magnetic recording medium tends to cause these problems. Generally, the spindle material of an HDD material has an average coefficient of linear expansion (coefficient of thermal expansion) of equal to or greater than $70 \times 10^{-7}$/° C. over a temperature range of 100 to 300° C. The glass substrate of the present invention can be used to provide a substrate that is suited to a magnetic recording medium having a magnetic recording layer comprised of a magnetic material of high Ku with an average coefficient of linear expansion of equal to or greater than $70 \times 10^{-7}$/° C. over a temperature range of 100 to 300° C. and thus enhance reliability. The average coefficient of linear expansion desirably falls within a range of equal to or greater than $71 \times 10^{-7}$/° C., preferably within a range of equal to or greater than $72 \times 10^{-7}$/° C., more preferably within a range of equal to or greater than $73 \times 10^{-7}$/° C., still more preferably within a range of equal to or greater than $74 \times 10^{-7}$/° C., even more preferably within a range of equal to or greater than $75 \times 10^{-7}$/° C. Taking into account the thermal expansion characteristics of the spindle material, the upper limit of the average coefficient of linear expansion is, for example, desirably about $120 \times 10^{-7}$/° C., preferably $100 \times 10^{-7}$/° C., and more preferably, $88 \times 10^{-7}$/° C.

3. Young's Modulus

Deformation of a magnetic recording medium includes deformation due to high speed rotation in addition to deformation due to change in the temperature of an HDD. To inhibit deformation during high speed rotation, it is required to increase the Young's modulus of the substrate for a magnetic recording medium. The glass substrate of the present invention has a Young's modulus of equal to or greater than 81 GPa, thereby inhibiting deformation in the substrate during high speed rotation and permitting the accurate reading and writing of data even on a magnetic recording medium of increased recording density comprising a magnetic material of high Ku. The Young's modulus desirably falls with a range of equal to or greater than 82 GPa, preferably within a range of equal to or greater than 83 GPa, more preferably within a range of equal to or greater than 84 GPa, further preferably within a range of equal to or greater than 85 GPa, still more preferably within a range of equal to or greater than 86 GPa. The upper limit of the Young's modulus can be, for example, 95 GPa as a yardstick, from the perspective of maintaining other characteristics within a preferred range.

4. Specific Modulus of Elasticity and Specific Gravity

The specific modulus of elasticity of the glass substrate of the present invention is equal to or greater than 30.0 MNm/kg and thus the deformation (flexure of the substrate) when the magnetic recording medium is rotated at high speed can be suppressed. The specific modulus of elasticity is preferably greater than 30.0 MNm/kg, more preferably equal to or greater than 30.5 MNm/kg. The upper limit is, for example, about 40.0 MNm/kg, but is not specifically limited. The specific modulus of elasticity is obtained by dividing the Young's modulus of the glass by its density. In this context, the density can be thought of as a quantity obtained by expressing the specific gravity of the glass in units of g/cm$^3$. Achieving a glass of low specific gravity makes it possible to lighten the substrate in addition to increasing the specific modulus of elasticity. Lightening the substrate can reduce the weight of the magnetic recording medium, thus reduce the electric power required to rotate the magnetic recording medium, and inhibit power consumption by an HDD. The specific gravity of the glass substrate of the present invention desirably falls within a range of equal to or less than 2.90, preferably within a range of equal to or less than 2.80, more preferably, with a range of less than 2.70.

5. Fracture Toughness Value

The fracture toughness value is measured by the following method.

An MVK-E apparatus made by Akashi Corp. is employed. A sample that has been processed into sheet form is pressed with a Vickers indenter at a load P [N] to introduce an indentation and cracks into the sample. Denoting the Young's modulus as E [GPa], the diagonal length of indentation as d [m], and the surface crack half-length as a [m], the fracture toughness value $K_{1c}$ [Pa·m$^{1/2}$] is given by the following equation:

$$K_{1c} = [0.026(EP/\pi)^{1/2}(d/2)(a)^{-2}]/[(\pi a)^{-1/2}]$$

The fracture toughness value (load P=9.81 N (1,000 gf)) of the glass constituting the glass substrate of the present invention is equal to or greater than 0.9 MPa·m$^{1/2}$. The fracture toughness value involves a trade-off with heat resistance. The greater the heat resistance that is employed to increase the recording density of a magnetic recording medium, the lower the fracture toughness value and the lower the impact resistance end up becoming. By contrast, the present invention can provide a glass substrate that is suited to magnetic recording media corresponding to high recording densities while achieving a balance between heat resistance, rigidity, and thermal expansion characteristics while increasing the fracture toughness value. The fracture toughness value desirably falls within a range of equal to or greater than 1.0 MPa·m$^{1/2}$, preferably within a range of equal to or greater than 1.1 MPa·m$^{1/2}$, and more preferably, within a range of equal to or greater than 1.2 MPa·m$^{1/2}$. A fracture toughness value of equal to or greater than 0.9 MPa·m$^{1/2}$ makes it possible to provide a magnetic recording medium of good impact resistance and high reliability corresponding to high recording density. Unless specifically stated otherwise, the fracture toughness value referred to in the present invention refers to the fracture toughness value as measured at a load P of 9.81 N (1,000 gf). The fracture toughness value is desirably measured on a smooth glass surface, such as a polished surface, from the perspective of accurate measurement of the diagonal length of indentation d and the surface crack half-length a. In the present invention, the fracture toughness value of a substrate of chemically strengthened glass is the value of the glass that has been chemically strengthened. Since the fracture toughness value varies with the composition of the glass and the chemical strengthening conditions, the glass substrate of a magnetic recording medium of the present invention comprised of chemically strengthened glass can be obtained by adjusting the composition and chemical strengthening treatment conditions to keep the fracture toughness value within the desired range.

The fracture toughness value of the glass constituting the glass substrate of the present invention can also be represented by the fracture toughness value at a load P of 4.9 N (500 gf). In that case, the fracture toughness value (load P=4.9 N (500 gf)) desirably exceeds 0.9 MPa·m$^{1/2}$, is preferably equal to or greater than 1.0 MPa·m$^{1/2}$, more preferably equal to or greater than 1.1 MPa·m$^{1/2}$, still more preferably equal to or greater than 1.2 MPa·m$^{1/2}$, and yet more preferably, equal to or greater than 1.3 MPa·m$^{1/2}$.

5. Acid Resistance

In the course of producing the glass substrate for a magnetic recording medium, the glass is processed into a disk shape and the main surface is processed to be extremely flat and smooth. Following these processing steps, normally, the glass substrate is cleaned with an acid to remove grime in the form of organic material that has adhered to the surface. In that case, when the glass substrate has poor acid resistance, the cleaning with an acid roughens the surface, flatness and smoothness are lost, and the glass substrate cannot be readily used in a magnetic recording medium. In a glass substrate for a magnetic recording medium with high recording density having a magnetic recording layer comprised of a magnetic material of high Ku in which high flatness and smoothness of the glass substrate surface are required, good acid resistance is particularly desirable.

A substrate that is rendered even cleaner by removing foreign matter such as abrasive that has adhered to the surface can be obtained by cleaning with an alkali following cleaning with an acid. To prevent a decrease in flatness and smoothness of the surface of the substrate due to roughening during cleaning with an alkali, the glass substrate desirably has good alkali resistance. Good acid resistance and alkali resistance that render high flatness and smoothness of the substrate surface are also advantageous from the perspective of low floating levels, as set forth above. In the present invention, good acid resistance and alkali resistance can be achieved by conducting adjustment of the glass composition described above, especially, by conducting adjustment of the composition that is advantageous for chemical durability.

6. Liquidus Temperature

In the course of melting glass and molding the glass melt obtained, the glass crystallizes and a homogenous glass cannot be produced when the molding temperature is lower than the liquidus temperature. Thus, the glass molding temperature must be greater than or equal to the liquidus temperature. However, when the molding temperature exceeds 1,300° C., for example, the pressing mold employed in the course of press molding a glass melt reacts with the hot glass and tends to be damaged. Even when conducting molding by casting a glass melt into a casting mold, the casting mold tends to be similarly damaged. Taking these points into account, the liquidus temperature of the glass constituting the glass substrate of the present invention is desirably equal to or lower than 1,300° C. The liquidus temperature preferably falls within a range of equal to or lower than 1,280° C., more preferably a range of equal to or lower than 1,250° C. In the present invention, the liquidus temperature within the above desirable range can be achieved by conducting adjustment of glass composition described above. The lower limit is not specifically limited, but a temperature of equal to or higher than 800° C. can be thought of as a yardstick.

7. Spectral Transmittance

A magnetic recording medium is produced by a process of forming a multilayered film comprising a magnetic recording layer on a glass substrate. In the course of forming a multilayered film on a substrate by the single substrate film forming method that is currently the mainstream, for example, the glass substrate is first introduced into the substrate heating region of a film-forming apparatus and heated to a temperature at which film formation by sputtering or the like is possible. Once the temperature of the glass substrate has risen adequately, the glass substrate is moved to a first film-forming region where a film corresponding to the lowest layer of the multilayer film is formed on the glass substrate. Next, the glass substrate is moved to a second film-forming region where a film is formed over the lowermost layer. The multi-layered film is thus formed by sequentially moving the glass substrate to subsequent film-forming regions and forming films. Since the heating and film formation are conducted under reduced pressure achieved by evacuation with a vacuum pump, heating of the substrate must be conducted by a non-contact method. Thus, the glass substrate is suitably heated by radiation. This film formation must be conducted while the glass substrate is not at a temperature that is lower than the temperature suited to film formation. When the time required for forming each layer of the film is excessively long, the temperature of the glass substrate that has been heated drops, and there is a problem in that it is impossible to achieve an adequate glass substrate temperature in subsequent film-forming regions. To maintain the glass substrate at a temperature permitting film formation for an extended period, heating the substrate to a higher temperature is conceivable. However, when the heating rate of the glass substrate is low, the heating period must be extended, and the time during which the glass substrate remains in the heating region must be increased. Thus, the residence time of the glass substrate in each film-forming region increases, and an adequate glass substrate temperature ends up not being maintained in subsequent film-forming regions. Further, it becomes difficult to increase throughput. In particular, when producing a magnetic recording medium comprising a magnetic recording layer comprised of a magnetic material of high Ku, it is desirable to further increase the efficiency of heating the glass substrate with radiation so as to heat the glass substrate to a high temperature within a prescribed period.

In glasses containing $SiO_2$ and $Al_2O_3$, absorption peaks are present in the region containing the wavelengths of 2,750 to 3,700 nm. The absorption of radiation at shorter wavelengths can be increased by adding an infrared-absorbing agent, described further below, or by incorporating it as a glass component, thereby imparting absorption in the wavelength range of wavelengths of 700 to 3,700 nm. The use of infrared radiation having a spectral maximum in the above wavelength range is desirable to efficiently heat the glass substrate with radiation, that is, by irradiation with infrared radiation. It is conceivable to increase the power of the infrared radiation while matching the maximum spectral wavelength of the infrared radiation with the peak absorption wavelength of the substrate. Taking the example of a high-temperature carbon heater as an infrared source, it suffices to increase the input to the carbon heater to increase the power of the infrared radiation. However, considering the radiation from the carbon heater as black body radiation, an increase in the input increases the heater temperature. This shifts the maximum wavelength of the infrared radiation spectrum to the short wavelength side, ending up outside the absorption wavelength region of the glass. Thus, the powder consumption of the heater must be made excessively high to increase the heating rate of the substrate, creating a problem by shortening the service lifetime of the heater or the like.

In light of such points, increasing the absorption of the glass in the above wavelength region (wavelengths 700 to 3,700 nm), irradiating infrared radiation with the maximum spectral wavelength of the infrared radiation in a state of proximity to the peak absorption wavelength of the substrate, and not employing an excessive heater input are desirable. Accordingly, to increase the infrared radiation heating efficiency, either the presence of a region in which the spectral transmittance as converted to a thickness of 2 mm is equal to or less than 50 percent in the 700 to 3,700 nm wavelength region in the glass substrate, or a glass substrate with transmittance characteristics such that the spectral transmission as converted to a thickness of 2 mm is equal to or less than 70 percent over the above wavelength region is desirable. For example, the oxide of at least one metal selected from the group consisting of iron, copper, cobalt, ytterbium, manganese, neodymium, praseodymium, niobium, cerium, vanadium, chromium, nickel, molybdenum, holmium, and erbium can function as an infrared-absorbing agent. Further, water or OH groups contained in water absorb strongly in the 3 μm band, so water can also function as an infrared-absorbing agent. Incorporating a suitable quantity of a component that is capable of functioning as the above infrared-absorbing agent into the glass composition can impart the above desirable absorption characteristic to the glass substrate. The quantity added of the oxide that is capable of functioning as the infrared-absorbing agent is desirably 500 ppm to 5 percent, preferably 2,000 ppm to 5 percent, more preferably 2000 ppm to 2 percent, and still more preferably, falls within a range of 4,000 ppm to 2 percent based on the mass as the oxide. For water, the incorporation of more than 200 ppm is desirable, and the incorporation of equal to or more than 220 ppm is preferred, based on weight as converted to $H_2O$.

When employing $Yb_2O_3$ and $Nb_2O_5$ as glass components, and when adding Ce oxide as a clarifying agent, infrared absorption by these components can be used to enhance substrate heating efficiency.

The glass constituting the glass substrate of the present invention is desirably amorphous glass because amorphous glass does not require a heat treatment step for crystallization and affords good processability. It also desirably comprises $SiO_2$ and $Al_2O_3$ as glass components.

$SiO_2$ is a glass network-forming component that has the effect of enhancing glass stability, chemical durability, and in particular, acid resistance. It is a component that functions to lower the heat dispersion of the substrate and increase heating efficiency in the course of heating the substrate with radiation in the step of forming the magnetic recording layer and the like on the glass substrate for a magnetic recording medium and in the heat treatment of the film that is formed in the above step. When the $SiO_2$ content is excessive, $SiO_2$ does not melt completely, leaving unmelted material in the glass, rendering the viscosity of the glass excessively high during clarification, and resulting in inadequate elimination of bubbles from the glass. Thus, the $SiO_2$ content desirably ranges from 56 to 75 mole percent.

$Al_2O_3$ is a component that works to enhance rigidity and heat resistance. An excessive $Al_2O_3$ content causes a drop in the resistance to devitrification (stability) of the glass. The content thereof is thus desirably 1 to 20 mole percent. The range of the $Al_2O_3$ content is preferably 1 to 15 mole percent, and more preferably, 1 to 11 mole percent.

Glasses containing $SiO_2$ and $Al_2O_3$ desirably also contain a glass component in the form of $R_2O$ (where R denotes Li, Na, or K). $R_2O$ is a component that has the effects of improving the meltability of the glass, improving the homogeneity of the glass, and increasing the coefficient of thermal expansion. It also permits chemical strengthening of the glass. However, when the content of $R_2O$ is excessively large, the glass transition temperature drops and chemical durability deteriorates. Thus, the content of $R_2O$ is desirably 4 to 20 mole percent. The content of $R_2O$ preferably falls within a range of 4 to 15 mole percent, and more preferably, falls within a range of 6 to 15 mole percent. In this context, the term "content of $R_2O$" means the combined content of $Li_2O$, $Na_2O$, and $K_2O$. The incorporation of $R_2O$ in the form of $Na_2O$, which has an effective chemical strengthening function without compromising high heat resistance, is desirable.

K has a higher atomic number than the alkali metals Li and Na. Among the alkali metal components, it functions to lower the fracture toughness value. When employing the glass substrate of the present invention as a chemically strengthened glass substrate, K functions to lower the ion exchange efficiency. Accordingly, the glass substrate for a magnetic recording medium of the present invention is desirably comprised of a glass with a $K_2O$ content of less than 3 mole percent. The $K_2O$ content preferably falls within a range of 0 to 2 mole percent, more preferably within a range of 0 to 1 mole percent, still more preferably within a range of 0 to 0.5 mole percent, yet more preferably within a range of 0 to 0.1 mole percent, and yet still more preferably, is 0 percent.

The above glass containing $SiO_2$, $Al_2O_3$, and $R_2O$ desirably contains a glass component in the form of an alkaline earth metal oxide R'O (where R' denotes Mg, Ca, Sr, or Ba). R'O has the effects of improving the meltability of the glass and increasing the coefficient of thermal expansion. However, when an excessively large quantity of R'O is incorporated, the glass transition temperature drops and chemical durability decreases, although not to the degree encountered when an excessive quantity of $R_2O$ is present. From these perspectives, the content of R' desirable falls within a range of 3 to 30 mole percent. In this context, the phrase "content of R'" means the combined content of MgO, CaO, SrO, and BaO. BaO may not be incorporated, and the combined content of alkaline earth metal oxides selected from the group consisting of MgO, CaO, and SrO is desirably 10 to 30 mole percent.

The above glass containing $SiO_2$, $Al_2O_3$, $R_2O$, and R'O preferably contains, in addition to $SiO_2$, $Al_2O_3$, $R_2O$, and R'O, an oxide selected from the group consisting of $ZrO_2$, $TiO_2$, $Y_2O_3$, $La_2O_3$, $Gd_2O_3$, $Nb_2O_3$, and $Ta_2O_3$. The components $ZrO_2$, $TiO_2$, $Y_2O_3$, $La_2O_3$, $Gd_2O_3$, $Nb_2O_3$, and $Ta_2O_3$ increase rigidity and heat resistance. Thus, at least one of the above components is desirably incorporated. However, the incorporation of an excessively large quantity compromises the meltability and thermal expansion characteristic of the glass. Accordingly, the combined content of the above oxides desirably falls within a range of greater than 0 mole percent but equal to or lower than 10 mole percent, preferably within a range of 0.5 to 10 mole percent.

$B_2O_3$ is a component that reduces brittleness of the glass substrate and increases glass meltability. However, the incorporation of an excessive quantity lowers heat resistance. Thus, in each of the above glasses, the quantity incorporated is desirably 0 to 3 mole percent, preferably 0 to 2 mole percent, more preferably equal to or greater than 0 mole percent but less than 1 percent, still more preferably 0 to 0.5 mole percent, with substantially no incorporation being possible.

Desirable glasses containing an oxide selected from the group consisting of $ZrO_2$, $TiO_2$, $Y_2O_3$, $La_2O_3$, $Gd_2O_3$, $Nb_2O_3$, and $Ta_2O_5$ in addition to $SiO_2$, $Al_2O_3$, $R_2O$, and R'O will be described next.

The glass constituting the substrate of the present invention is desirably a glass comprising:
56 to 75 mole percent of $SiO_2$;
1 to 20 mole percent of $Al_2O_3$;
a total of 6 to 15 mole percent of alkali metal oxides selected from the group consisting of $Li_2O$, $Na_2O$, and $K_2O$;
a total of 10 to 30 mole percent of alkaline earth metal oxides selected from the group consisting of MgO, CaO, and SrO; and
a total of greater than 0 mole percent but equal to or less than 10 mole percent of oxides selected from the group consisting of $ZrO_2$, $TiO_2$, $Y_2O_3$, $La_2O_3$, $Gd_2O_3$, $Nb_2O_3$, and $Ta_2O_5$;

with a composition adjusted so as to achieve a glass transition temperature of equal to or greater than 600° C., an average coefficient of linear expansion at 100 to 300° C. of equal to or greater than $70 \times 10^{-7}$/° C., a Young's modulus of equal to or greater than 81 GPa, a specific modulus of elasticity of equal to or greater than 30 MNm/kg, and a fracture toughness value of equal to or greater than 0.9 MPa·m$^{1/2}$. In adjusting the composition, the desirable range of the $K_2O$ content of the glass, for example, is as set forth above. BaO, an alkaline earth metal oxide, functions to lower fracture toughness. Thus, the upper limit of the BaO content is desirably limited so that the fracture toughness value is equal to or greater than 0.9 MPa·m$^{1/2}$. The fracture toughness value desirably falls within the range set forth above. When employing a fracture toughness value measured at a load of 4.9 N (500 gf), it suffices to limit the upper limit of the BaO content so that the fracture toughness value (at a load of 4.9 N (500 gf)) exceeds 0.9 MPa·m$^{1/2}$. The fracture toughness value (at a load of 4.9 N (500 gf)) desirably falls within the range set forth above. As stated above, it is possible not to incorporate BaO. When the glass substrate of the present invention is chemically strengthened, at least a portion of the alkali metal atoms constituting the alkali metal oxide in the substrate are ion exchanged. In the present invention, unless specifically stated otherwise, the same applies to the glass composition of a glass substrate that is chemically strengthened.

A desirable form of the glass substrate for a magnetic recording medium of the present invention is a glass substrate characterized by being chemically strengthened, that is, a chemically strengthened glass substrate. Chemical strengthening can further increase the fracture toughness value of the glass substrate. From the perspective of further raising the fracture toughness value, chemical strengthening is desirably conducted with melt of potassium nitrate or sodium nitrate, or melt of potassium nitrate and potassium nitrate. To obtain a chemically strengthened glass substrate, the glass that is subjected to a chemical strengthening treatment to obtain the glass substrate contains a glass component in the form of an ion-exchangeable component such as the above alkali metal oxides, desirably $Li_2O$ and/or $Na_2O$.

The glass substrate for a magnetic recording medium of the present invention has a high Young's modulus, a high specific modulus of elasticity, and a high fracture toughness value. Thus, it is suitably employed in magnetic recording media with a rotational speed of equal to or higher than 7,200 rpm of which high reliability is demanded, and is preferably employed in magnetic recording media with a rotational speed of equal to or higher than 10,000 rpm.

Similarly, the glass substrate for a magnetic recording medium of the present invention is suitably employed in magnetic recording apparatuses on which DFH (dynamic flying height) heads, of which high reliability is demanded, are mounted.

Examples of preferred compositions of the glass constituting the glass substrate are given below.

An example of the above glass, denoted as mole percentages, comprises:
56 to 75 percent of $SiO_2$;
1 to 20 percent of $Al_2O_3$;
greater than 0 percent but equal to or less than 4 percent of $Li_2O$;
equal to or greater than 1 percent but less than 15 percent of $NaO_2$; and
equal to or greater than 0 percent but less than 3 percent of $K_2O$; and comprises substantially no BaO;

with the total content of alkali metal oxides selected from the group consisting of $Li_2O$, $Na_2O$, and $K_2O$ falling within a range of 6 to 15 percent;

the molar ratio of the content of $Li_2O$ to the content of $Na_2O$ ($Li_2O/Na_2O$) being less than 0.50;

the molar ratio of the $K_2O$ content to the total content of the above alkali metal oxides ($K_2O/(Li_2O+Na_2O+K_2O)$) being equal to or lower than 0.13;

the total content of alkaline earth metal oxides selected from the group consisting of MgO, CaO, and SrO falling within a range of 10 to 30 percent;

the total content of MgO and CaO falling within a range of 10 to 30 percent;

the molar ratio of the total content of MgO and CaO to the total content of the above alkaline earth metal oxides ($(MgO+CaO)/(MgO+CaO+SrO)$) being equal to or greater than 0.86;

the total content of the above alkali metal oxides and the above alkaline earth metal oxides falling within a range of 20 to 40 percent;

the molar ratio of the total content of MgO, CaO, and $Li_2O$ to the total content of the alkali metal oxides and the alkaline earth metal oxides ($(MgO+CaO+Li_2O)/(Li_2O+Na_2O+K_2O+MgO+CaO+SrO)$) being equal to or greater than 0.50;

the total content of oxides selected from the group consisting of $ZrO_2$, $TiO_2$, $Y_2O_3$, $La_2O_3$, $Gd_2O_3$, $Nb_2O_5$, and $Ta_2O_5$ being greater than 0 percent but equal to or less than 10 percent; and the molar ratio of the total content of the above oxides to the $Al_2O_3$ content ($(ZrO_2+TiO_2+Y_2O_3+La_2O_3+Gd_2O_3+Nb_2O_5+Ta_2O_5)/Al_2O_3$) being equal to or greater than 0.40 (denoted as glass A, hereinafter).

Hereinafter, unless specifically stated otherwise, the content of the individual components, total contents, and ratios are to be construed as being denoted based on mols.

The above glass is oxide glass, desirably amorphous oxide glass, the composition of which is denoted based on the oxides. The term "glass composition based on oxides" is the glass composition obtained by assuming that all of the glass starting materials decompose during melting and are present as oxides in the glass. In the description of individual glass components below, unless specifically stated otherwise, the contents, total contents and ratios of the individual components apply to glass A.

$SiO_2$ is a glass network-forming component that has the effect of enhancing glass stability, chemical durability, and in particular, acid resistance. It is a component that functions to lower the heat dispersion of the substrate and increase heating efficiency in the course of heating the substrate with radiation in the step of forming the magnetic recording layer and the like on the glass substrate for a magnetic recording medium and in the heat treatment of the film that is formed in the above step. When the $SiO_2$ content is less than 56 percent, chemical durability decreases, and at above 75 percent, rigid decreases. When the $SiO_2$ content exceeds 75 percent, the $SiO_2$ does not melt completely, leaving unmelted material in the glass, rendering the viscosity of the glass excessively high during clarification, and resulting in inadequate elimination of bubbles from the glass. When a substrate is made from glass containing unmelted material, protrusions are produced by the unmelted material on the surface of the substrate by polishing, precluding its use as the substrate of a magnetic recording medium, which is required to have an extremely smooth surface. When a substrate is prepared from glass containing bubbles, polishing exposes portions of bubbles on the surface of the substrate. Those portions become pits, compromising the smoothness of the main surface of the substrate and precluding its use as a substrate in a magnetic recording medium. Thus, the $SiO_2$ content is 56 to 75 percent. The $SiO_2$ content desirably falls within a range of 58 to 70 percent, preferably within a range of 60 to 70 percent.

$Al_2O_3$ is a component that contributes to forming the glass network and functions to enhance rigidity and heat resistance. However, when the content of $Al_2O_3$ exceeds 20 percent, the resistance to devitrification (stability) of the glass decreases. Thus, the quantity incorporated is set to equal to or less than 20 percent. Additionally, when the $Al_2O_3$ content drops below 1 percent, the stability, chemical durability, and heat resistance of the glass decrease. Thus, the quantity incorporated is equal to or greater than 1 percent. Accordingly, the quantity of $Al_2O_3$ falls within a range of 1 to 20 percent. From the perspective of the stability, chemical durability, and heat resistance of the glass, the content of $Al_2O_3$ desirably falls within a range of 1 to 15 percent, preferably within a range of 1 to 11 percent. From the perspectives of the stability, chemical durability, and heat resistance of the glass, the content of $Al_2O_3$ desirably falls within a range of 1 to 10 percent, preferably within a range of 2 to 9 percent, and more preferably, within a range of 3 to 8 percent. From the perspective of the chemical strengthening treatment of the glass substrate, the content of $Al_2O_3$ desirably falls within a range of 5 to 20 percent.

$Li_2O$ is a component that increases the rigidity of the glass. The readiness of migration within the glass of the alkali metals is Li>Na>K. Thus, the incorporation of Li is advantageous from the perspective of the chemical strengthening property. However, the incorporation of an excessively large quantity tends to decrease heat resistance. Thus, the quantity incorporated is equal to or less than 4 percent. That is, the content of $Li_2O$ is greater than 0 percent but equal to or less than 4 percent. From the perspectives of high rigidity, high heat resistance, and the chemical strengthening property, the content of $Li_2O$ desirably falls within a range of 0.1 to 3.5 percent, preferably falls within a range of 0.5 to 3 percent, more preferably falls within a range of greater than 1 percent but equal to or less than 3 percent, and still more preferably, falls within a range of greater than 1 percent but equal to or less than 2.5 percent.

As set forth above, the incorporation of an excessive quantity of $Li_2O$ tends to decrease heat resistance. The incorporation of an excessive quantity of $Na_2O$ also tends to decrease heat resistance. Thus, the quantity that is incorporated is adjusted relative to the quantity of $Na_2O$ that is incorporated so that the molar ratio of the quantity of $Li_2O$ to the quantity of $Na_2O$ ($Li_2O/Na_2O$) falls within a range of less than 0.50. From the perspective of preventing a drop in heat resistance while achieving an effect by introducing $Li_2O$, the molar ratio of ($Li_2O/Na_2O$) desirably falls within a range of equal to or higher than 0.01 to less than 0.50, preferably within a range of 0.02 to 0.40, more preferably within a range of 0.03 to 0.40, still more preferably within a range of 0.04 to 0.30, and yet still more preferably, within a range of 0.05 to 0.30.

Additionally, the quantity of $Li_2O$ incorporated tends to decrease heat resistance when excessively high, and decrease the chemical strengthening property when excessively low, relative to the total content of alkali metal oxides ($Li_2O+Na_2O+K_2O$). Thus, the quantity of $LiO_2$ incorporated is desirably adjusted relative to the total content of alkali metal oxides so that the molar ratio of ($Li_2O/(Li_2O+Na_2O+K_2O)$) of the $Li_2O$ content relative to the total content of alkali metal oxides falls within a range of less than ⅓. From the perspective of preventing a drop in heat resistance while achieving an effect by introducing $Li_2O$, the upper limit of the molar ratio of $\{Li_2O/(Li_2O+Na_2O+K_2O)\}$ is preferably 0.28, and more preferably, 0.23. From the perspective of preventing a decrease in the chemical strengthening property, the lower limit of the molar ratio of $\{Li_2O/(Li_2O+Na_2O+K_2O)\}$ is desirably 0.01, preferably 0.02, more preferably 0.03, still more preferably 0.04, and yet still more preferably, 0.05.

$Na_2O$ is an effective component for improving the thermal expansion characteristic, and is thus incorporated in a proportion of equal to or greater than 1 percent. $Na_2O$ is a component that also contributes to the chemical strengthening property, and is thus advantageously incorporated in a quantity of equal to or greater than 1 percent from the perspective of the chemical strengthening property. However, the incorporation of a quantity of equal to or greater than 15 percent tends to decrease heat resistance. Accordingly, the content of $Na_2O$ is equal to or greater than 1 percent but less than 15 percent. From the perspectives of thermal expansion characteristics, heat resistance, and the chemical strengthening property, the content of $Na_2O$ desirably falls within a range of 4 to 13 percent, and preferably falls within a range of 5 to 11 percent.

$K_2O$ is an effective component for improving the thermal expansion characteristic. The incorporation of an excessively large quantity tends to decrease heat resistance and thermoconductivity and compromise the chemical strengthening property. Thus, the quantity incorporated is less than 3 percent. That is, the content of $K_2O$ is equal to or greater than 0 percent but less than 3 percent. From the perspective of enhancing the thermal expansion characteristic while maintaining heat resistance, the content of $K_2O$ desirably falls within a range of 0 to 2 percent, preferably within a range of 0 to 1 percent, more preferably within a range of 0 to 0.5 percent, and still more preferably, within a range of 0 to 0.1 percent. From the perspectives of heat resistance and the chemical strengthening property, it is desirably substantially not incorporated. In the present invention, the phrases "substantially not containing" and "substantially not incorporated" mean that a specific component is not intentionally added to the glass starting materials, but its presence as an impurity is not excluded. The statement of "0 percent of the glass composition" has the same meaning.

When the total content of alkali metal oxides selected from the group consisting of $Li_2O$, $Na_2O$, and $K_2O$ is less than 6 percent, the meltability and thermal expansion characteristic of the glass decrease, and when it exceeds 15 percent, heat resistance decreases. Accordingly, from the perspectives of the glass meltability, thermal expansion characteristic, and heat resistance, the total content of alkali metal oxides selected from the group consisting of $Li_2O$, $Na_2O$, and $K_2O$ is 6 to 15 percent, desirably 7 to 15 percent, preferably 8 to 13 percent, and more preferably, falls within a range of 8 to 12 percent.

Glass A exemplified here substantially contains no BaO. The incorporation of BaO is excluded for the following reasons.

To increase recording density, it is necessary to reduce the distance between the magnetic head and the surface of the magnetic recording medium and increase the read and write resolution. Thus, in recent years, reduction in the height at which the head floats (reduction in the spacing between the magnetic head and the surface of the magnetic recording medium) has progressed. As a result, the presence of even minute protrusions on the surface of the magnetic recording medium is no longer tolerated. In recording and reproducing systems with low floating levels, even minute protrusions collide with the head, damaging the head element and the like. Additionally, BaO reacts with carbonic acid gas in the atmosphere, producing $BaCO_3$, which adheres to the surface of the glass substrate. Accordingly, BaO is not incorporated from the perspective of reducing deposits. In addition, BaO is a component that may cause change in the property of the glass surface (referred to as weathering), creating the risk of the formation of minute protrusions on the substrate surface. Thus, BaO is excluded to prevent weathering of the glass surface. Ba-free glass is also desirable to reduce the burden on the environment.

Additionally, the glass substrate containing substantially no BaO is desirable in a magnetic recording medium in which a heat-assisted recording method is employed. The reasons for this are as follows.

The higher the recording density, the smaller the bit size employed. For example, the target value of the bit size for achieving high density recording exceeding one terabyte/$inch^2$ is a diameter of several tens of nanometers. When recording at such a minute bit size, the area that is heated in heat-assisted recording must be about the same as the bit size. To conduct high-speed recording at a minute bit size, the time that is expended on recording a single bit becomes extremely short. Thus, heat-assisted heating and cooling must be instantaneously completed. That is, the heating and cooling of a magnetic recording medium that is employed in heat-assisted recording must be conducted in as rapid and localized a fashion as possible.

Accordingly, the positioning of a heat sink layer comprised of a' highly thermoconductive material (such as a Cu film) between the substrate and the magnetic recording layer of a magnetic recording medium for heat-assisted recording has been proposed (for example, see Japanese Unexamined Patent Publication (KOKAI) No. 2008-52869). The heat sink layer prevents heat diffusion in in-plane directions and accelerates the flow of heat in the vertical (depth) direction, thereby serving as a layer that causes heat applied to the recording layer to escape not in an in-plane direction, but in the vertical (thickness) direction. The thicker the heat sink layer is made, the more rapidly and more localized the fashion in which heat and cooling can be implemented. However, the formation of a thick heat sink layer requires a long film formation period, compromising productivity. Increasing the thickness of the heat sink layer also increases the amount of heat accumulating during film formation, effectively disrupting the crystallinity and crystal orientation of the magnetic layer formed over it and sometimes making it difficult to improve recording density. Further, the thicker the heat sink layer becomes, the greater the possibility that corrosion will occur in the heat sink layer, causing the film as a whole to mound up and generate convex defects and hindering a low flotation level. When iron materials are employed in the heat sink layer, in particular, the potential of this phenomenon occurring is high.

Providing a thick heat sink layer as set forth above affords advantages in terms of achieving rapid and localized heating and cooling, but is undesirable from the perspectives of productivity, increasing recording density, and reducing the flotation level. As a countermeasure, it is conceivably possible to increase the thermoconductivity of the glass substrate to complement the role of the heat sink layer.

In this context, glass A is comprised of components in the form of $SiO_2$, $Al_2O_3$, alkali metal oxides, alkaline earth metal oxides, and the like. Among these, the alkali metal oxides and alkaline earth metal oxides function as modifying components to improve the meltability of the glass and increase its coefficient of thermal expansion. Accordingly, they must be incorporated into the glass in certain quantities. Among them, Ba, which has the highest atomic number, has the greatest effect in lowering the thermoconductivity of a glass. Since no BaO is contained, there is no reduction in thermoconductivity due to BaO. Accordingly, even with a thin heat sink layer, heating and cooling can be conducted in rapid and localized fashion.

Among the alkaline earth metal oxides, BaO functions to maintain the highest glass transition temperature. The molar ratio {(MgO+CaO)/(MgO+CaO+SrO)} of the total content of MgO and CaO to the total content of MgO, CaO, and SrO is set to equal to or more than 0.86 so as to prevent a decrease in the glass transition temperature due to not employing BaO. This is because for a given total quantity of alkaline earth metal oxides, it is possible to maintain a higher glass transition temperature by using a blend that concentrates the total quantity in one or two alkaline earth metal oxides than by means of a blend employing multiple alkaline earth metal oxides. That is, it is possible to suppress the drop in the glass transition temperature due to not employing BaO by setting the above molar ratio to equal to or more than 0.86. As set forth above, one of the characteristics required of a glass substrate is high rigidity (high Young's modulus). A low specific gravity is another characteristic that is desirable in a glass substrate, as set forth further below. To achieve a high Young's modulus and a low specific gravity, alkaline earth metal oxides in the form of MgO and CaO are advantageously incorporated with preference. Accordingly, keeping the above molar ratio to equal to or more than 0.86 also has the effect of achieving a high Young's modulus and a low specific gravity in the glass substrate. From the above-described perspectives, the above molar ratio is desirably equal to or more than 0.88, preferably equal to or more than 0.90, more preferably equal to or more than 0.93, still more preferably equal to or more than 0.95, even more preferably equal to or more than 0.97, yet more preferably equal to or more than 0.98, yet still more preferably equal to or more than 0.99, and optimally, 1.

When the total content of alkaline earth metal oxides selected from the group consisting of MgO, CaO, and SrO is excessively low, the rigidity and thermal expansion characteristic of the glass decrease; when excessively high, chemical durability drops. To achieve high rigidity, high thermal expansion characteristic, and good chemical durability, the total content of the above alkaline earth metal oxides is set to 10 to 30 percent, desirably 10 to 25 percent, preferably to 11 to 22 percent, more preferably to 12 to 22 percent, still more preferably to 13 to 21 percent, and yet still more preferably, to within a range of 15 to 20 percent.

As set forth above, MgO and CaO are components that are preferentially incorporated in a total content of 10 to 30 percent. When the total content of MgO and CaO is less than 10 percent, rigidity and the thermal expansion characteristic decrease. When it exceeds 30 percent, chemical durability drops. From the perspective of achieving a good effect by preferentially incorporating MgO and CaO, the range of the total content of MgO and CaO is desirably 10 to 25 percent, preferably 10 to 22 percent, more preferably 11 to 20 percent, and still more preferably, 12 to 20 percent.

Further, among the alkaline metal oxides, $K_2O$ has a high atomic number, functions to greatly lower thermal conductivity, and is disadvantageous from the perspective of the chemical strengthening property. Thus, the content of $K_2O$ is limited with respect to the total content of alkali metal oxides. The molar ratio $\{K_2O/(Li_2O+Na_2O+K_2O)\}$ of the $K_2O$ content to the total content of the alkali metal oxides is set to equal to or lower than 0.13. From the perspectives of the chemical strengthening property and thermal conductivity, this molar ratio is desirably equal to or lower than 0.10, preferably equal to or lower than 0.08, more preferably equal to or lower than 0.06, still more preferably equal to or lower than 0.05, even more preferably equal to or lower than 0.03, yet even more preferably equal to or lower than 0.02, yet still more preferably equal to or lower than 0.01, and optimally, substantially zero. That is, $K_2O$ is optimally not incorporated.

The total content $(Li_2O+Na_2O+K_2O+MgO+CaO+SrO)$ of the alkali metal oxides and the alkaline earth metal oxides is 20 to 40 percent. This is because at less than 20 percent, glass meltability, the coefficient of thermal expansion, and rigidity decrease, and at greater than 40 percent, chemical durability and resistance to heat diminish. From the perspective of maintaining various characteristics described above in a good level, the total content of the alkali metal oxides and alkaline earth metal oxides desirably falls within a range of 20 to 35 percent, preferably within a range of 21 to 33 percent, and more preferably, within a range of 23 to 33 percent.

As set forth above, MgO, CaO, and $Li_2O$ are effective components for achieving high glass rigidity (a high Young's modulus). When the total of these three components is excessively low relative to the total of the alkali metal oxides and alkaline earth metal oxides, it becomes difficult to achieve a high Young's modulus. Accordingly, in glass A, the total content of MgO, CaO, and $Li_2O$ incorporated is adjusted relative to the total content of the alkali metal oxides and alkaline earth metal oxides to achieve a molar ratio $\{(MgO+CaO+Li_2O)/(Li_2O+Na_2O+K_2O+MgO+CaO+SrO)\}$ of MgO, CaO, and $Li_2O$ to the total content of the alkali metal oxides and alkaline earth metal oxides of equal to or more than 0.50. To achieve a glass substrate with an even higher Young's modulus, this molar ratio is desirably equal to or more than 0.51, preferably equal to or more than 0.52. From the perspective of glass stability, this molar ratio is desirably equal to or less than 0.80, preferably equal to or less than 0.75, and more preferably, equal to or less than 0.70.

With regard to the quantity of individual alkaline earth metal oxides incorporated, no BaO is substantially incorporated as set forth above.

From the perspectives of raising the Young's modulus, lowering the specific gravity, and increasing the specific modulus of elasticity, the MgO content is desirably 0 to 14 percent, preferably 0 to 10 percent, more preferably 0 to 8 percent, still more preferably 0 to 6 percent, and yet more preferably, falls within a range of 1 to 6 percent. The specific modulus of elasticity will be described further below.

From the perspectives of enhancing the thermal expansion characteristics and Young's modulus and lowering the specific gravity, CaO is desirably incorporated in a quantity of 3 to 20 percent, preferably 4 to 20 percent, and more preferably, within a range of 10 to 20 percent.

SrO is a component that improves the thermal expansion characteristic, but also raises the specific gravity more than MgO and CaO. It is thus desirably incorporated in a quantity of equal to or less than 4 percent, preferably equal to or less than 3 percent, more preferably equal to or less than 2.5 percent, still more preferably equal to or less than 2 percent, yet still more preferably equal to or less than 1 percent, and may be substantially not incorporated.

From the perspective of a mixed alkaline earth effect, it is desirable to add, not multiple alkaline earth metal oxides, but a single component from among the alkaline earth oxides to achieve a high glass transition temperature. When multiple alkaline earth oxides are added, they can be selected so that the ratio of the alkaline earth oxide that is present in greatest quantity is equal to or more than 70 percent, preferably equal to or more than 80 percent, more preferably equal to or more than 90 percent, and even more preferably, equal to or more than 95 percent of the total quantity of alkaline earth metal oxides.

The contents and proportions of $SiO_2$, $Al_2O_3$, alkali metal oxides, and alkaline earth metal oxides are as set forth above.

Glass A exemplified here also contains the oxide components indicated below. They will be described in detail below.

At least one oxide selected from the group consisting of $ZrO_2$, $TiO_2$, $Y_2O_3$, $La_2O_3$, $Gd_2O_3$, $Nb_2O_5$, and $Ta_2O_5$ is incorporated as a component to increase rigidity and heat resistance. However, the incorporation of an excessive quantity lowers glass meltability and the thermal expansion characteristic. Thus, the total content of the above oxides exceeds 0 percent but does not exceed 10 percent, is desirably 1 to 10 percent, preferably 2 to 10 percent, more preferably 2 to 9 percent, still more preferably 2 to 7 percent, and yet still more preferably, falls within a range of 2 to 6 percent.

As set forth above, $Al_2O_3$ is a component that increases rigidity and heat resistance. However, the above oxides function more greatly to raise Young's modulus. The above oxides are incorporated in a molar ratio of equal to or more than 0.4 relative to $Al_2O_3$. That is, the molar ratio $\{(ZrO_2+TiO_2+Y_2O_3+La_2O_3+Gd_2O_3+Nb_2O_5+Ta_2O_5)/Al_2O_3\}$ of the total content of the above oxides to the $Al_2O_3$ content is set to equal to or more than 0.40, thereby making it possible to increase rigidity and heat resistance. From the perspective of further improving rigidity and heat resistance, this molar ratio is desirably equal to or more than 0.50, preferably equal to or more than 0.60, and more preferably, equal to or more than 0.70. From the perspective of glass stability, this molar ratio is desirably equal to or less than 4.00, preferably equal to or less than 3.00, more preferably equal to or less than 2.00, still more preferably equal to or less than 1.00, yet still more preferably equal to or less than 0.90, and even still more preferably, equal to or less than 0.85.

$B_2O_3$ is a component that reduces brittleness of the glass substrate and increases glass meltability. However, the incorporation of an excessive quantity lowers heat resistance. Thus, the quantity incorporated is desirably 0 to 3 percent, preferably 0 to 2 percent, more preferably equal to or greater than 0 percent but less than 1 percent, still more preferably 0 to 0.5 percent, with substantially no incorporation being possible.

$Cs_2O$ is a component that can be incorporated in a small quantity within a range at which desired characteristics and properties are not compromised. However, it is a component that increases the specific gravity more than other alkali metal oxides, and so may be substantially not incorporated.

ZnO is a component that increases glass meltability, moldability, stability, rigidity, and the thermal expansion characteristic. However, the incorporation of an excessive quantity lowers heat resistance and chemical durability. Thus, the quantity incorporated is desirably 0 to 3 percent, preferably 0 to 2 percent, and more preferably, 0 to 1 percent, with substantially no incorporation being possible.

As set forth above, $ZrO_2$ is a component that increases rigidity and heat resistance and enhances chemical durability. However, the incorporation of an excessive quantity reduces glass meltability. Thus, the quantity incorporated is desirably 1 to 8 percent, preferably 1 to 6 percent, and more preferably, 2 to 6 percent.

$TiO_2$ is a component that serves to suppress an increase in specific gravity and increase rigidity, thereby increasing the specific modulus of elasticity. However, the incorporation of an excessive quantity sometimes produces reaction products between the substrate surface and water when the glass substrate comes into contact with water, producing deposits. Thus, the quantity incorporated is desirably 0 to 6 percent, preferably 0 to 5 percent, more preferably 0 to 3 percent, still more preferably 0 to 2 percent, yet still more preferably equal to or greater than 0 percent but less than 1 percent, with substantially no incorporation being possible.

$Y_2O_3$, $Yb_2O_3$, $La_2O_3$, $Gd_2O_3$, $Nb_2O_5$, and $Ta_2O_5$ are advantageous components from the perspectives of increasing chemical durability, enhancing heat resistance, and improving rigidity and fracture toughness. However, their incorporation in an excessively large quantity compromises meltability and increases the specific gravity. They also involve the use of expensive starting materials. Thus, their content is desirably kept low. Accordingly, the total content of these components that is incorporated is desirably 0 to 3 percent, preferably 0 to 2 percent, more preferably 0 to 1 percent, still more preferably 0 to 0.5 percent, and yet still more preferably, 0 to 0.1 percent. When emphasizing improved meltability, low specific gravity, and reduced cost, it is desirable to substantially not incorporate them.

$HfO_2$ is also a component that is advantageous from the perspectives of enhancing chemical durability and heat resistance, and increasing rigidity and fracture toughness. However, the incorporation of an excessive quantity compromises meltability and increases the specific gravity. It also involves the use of expensive starting materials, and is thus desirably employed only in a small quantity, or substantially not employed at all.

Taking into account the environmental effects of Pb, As, Cd, Te, Cr, Ti, U, and Th, they are desirably substantially not incorporated at all.

From the perspective of increasing both heat resistance and meltability, the molar ratio of $\{(SiO_2+Al_2O_3+ZrO_2+TiO_2+Y_2O_3+La_2O_3+Gd_2O_3+Nb_2O_5+Ta_2O_5)/(Li_2O+Na_2O+K_2O)\}$ of $SiO_2$, $Al_2O_3$, $ZrO_2$, $TiO_2$, $Y_2O_3$, $La_2O_3$, $Gd_2O_3$, $Nb_2O_5$, and $Ta_2O_5$ to the total content of the above alkali metal oxides ($Li_2O$, $Na_2O$, and $K_2O$) desirably falls within a range of 3 to 15, preferably 3 to 12, more preferably 4 to 12, still more preferably 5 to 12, yet still more preferably 5 to 11, and yet still more preferably, falls within a range of 5 to 10.

Glass A of the composition that is given by way of example above can be chemically strengthened.

Method of Manufacturing Glass Substrate for Magnetic Recording Medium

The present invention further relates to a method of manufacturing a glass substrate for a magnetic recording medium. The method of manufacturing a glass substrate for a magnetic recording medium of the present invention comprises a step of polishing a glass material with a fracture toughness value $K_1$, of less than $1.3 \text{ MPa·m}^{1/2}$ and a chemical strengthening step following the polishing step to manufacture the above glass substrate for a magnetic recording medium.

In mechanical processing such as polishing, a glass of low fracture toughness is easier to process. Accordingly, in the method of manufacturing a glass substrate for a magnetic recording medium of the present invention, a glass material with a fracture toughness value $K_1$, of less than $1.3 \text{ MPa·m}^{1/2}$ can be mechanically processed and then chemically strengthened to raise the fracture toughness, permitting the manufacturing of a glass substrate of high fracture toughness value such as set forth above and good impact resistance. The fracture toughness can be kept to a desired value primarily by means of the chemical strengthening conditions. For example, the more the chemical strengthening conditions are intensified (for example, by extending the processing time), the higher the fracture toughness value can be rendered.

The fracture toughness value of the glass material is desirably equal to or lower than $1.2 \text{ MPa·m}^{1/2}$, preferably equal to or lower than $1.1 \text{ MPa·m}^{1/2}$, more preferably equal to or lower than $1.0 \text{ MPa·m}^{1/2}$, still more preferably equal to or lower than $0.9 \text{ MPa·m}^{1/2}$, and yet still more preferably, equal to or lower than $0.8 \text{ MPa·m}^{1/2}$.

In the method of manufacturing a glass substrate for a magnetic recording medium of the present invention, a further polishing step can be conducted after the chemical strengthening step. A desirable form of the method of manufacturing a glass substrate for a magnetic recording medium of the present invention is a method of manufacturing a glass substrate for a magnetic recording medium comprising a chemical strengthening step, and the chemical strengthening step is characterized by being a step in which the ratio of the fracture toughness value $K_{1c}$ (after) of the glass material following chemical strengthening to the fracture strength $K_{1c}$ (before) of the glass material before the chemical strengthening ($K_{1c}$ (after)/$K_{1c}$ (before)) is equal to or greater than 1.5. In this method, the glass material having a fracture toughness value suited to mechanical processing is mechanically processed by polishing or the like and then chemically strengthened to raise the fracture toughness value, raising the ratio of ($K_{1c}$ (after)/$K_{1c}$ (before)) to equal to or greater than 1.5, or even equal to or greater than 1.7, and thereby making it possible to manufacture a glass substrate for a magnetic recording medium with good impact resistance. In the method of manufacturing a glass substrate for a magnetic recording medium of the present invention, $K_{1c}$ (after) and $K_{1c}$ (before) are both fracture toughness values measured at the same loads. When $K_{1c}$ (before) is measured at a load of 9.81 N (1,000 gf), $K_{1c}$ (after) is also a value measured at a load of 9.81 N (1,000 gf). When $K_{1c}$ (before) is measured at a load of 4.9 N (500 gf), $K_{1c}$ (after) is also a value measured at a load of 4.9 N (500 gf).

In the preparation of a chemically strengthened glass substrate, the $B_2O_3$ incorporated as a glass component increases $K_{1c}$ (before) and lowers the mechanical processability prior to chemical strengthening. However, since it does not contribute to enhancing chemical strengthening property, to obtain glass with a high $K_{1c}$ (after)/$K_{1c}$ (before), the content of $B_2O_3$ is desirably limited to within a range of 0 to 3 percent, preferably limited to within a range of 0 to 2 percent, and more preferably, limited to within a range of 0 percent to less than 1 percent. Limitation to a range of 0 to 0.5 percent is further preferred, and substantially incorporating none at all is still further preferred. The phrase "fracture toughness value $K_{1c}$ (before) before chemical strengthening means a value measured after the polishing step.

The glass substrate for a magnetic recording medium of the present invention can be comprised of glass, obtained by subjecting glass with a molar ratio of the $K_2O$ content to the total content of alkali metal oxides ($K_2O/Li_2O+Na_2O+K_2O$) of equal to or lower than 0.13 to a chemical strengthening treatment, with a glass transition temperature of equal to or greater than 640° C. and a fracture toughness value of equal to or greater than 0.9 $MPa \cdot m^{1/2}$.

The glass substrate for a magnetic recording medium of the present invention can be comprised of a glass with a glass transition temperature of equal to or greater than 600° C., a Young's modulus of equal to or greater than 81 GPa, a specific modulus of elasticity of equal to or greater than 30 MNm/kg, and a fracture toughness value of equal to or greater than 0.9 $MPa \cdot m^{1/2}$, in which the total content of alkaline earth metals oxides selected from the group consisting of MgO, CaO, and SrO is 10 to 30 percent, and the ratio MgO/(MgO+CaO+SrO) is equal to or greater than 0.80, preferably equal to or greater than 0.90, more preferably equal to or greater than 0.95, and optimally, 1.0.

Magnetic Recording Medium

A further aspect of the present invention relates to a magnetic recording medium comprising a magnetic recording layer on the glass substrate of the present invention.

The magnetic recording medium of the present invention will be described in greater detail below.

The magnetic recording medium of the present invention can be a disk-shaped magnetic recording medium (referred to as a magnetic disk, hard disk, or the like) of laminated configuration comprised of, on the main surface of a glass substrate, and in order from the main surface outward, at least an adhesive layer, an undercoat layer, a magnetic layer (magnetic recording layer), a protective layer, and a lubricating layer.

For example, the glass substrate can be placed in a film-forming apparatus in which a vacuum has been drawn, and the adhesive layer through the magnetic layer sequentially formed on the main surface of the glass substrate in an Ar atmosphere by the DC magnetron sputtering method. By way of example, CrTi can be employed as the adhesive layer and CrRu employed as the undercoat layer. Following this film formation, for example, CVD method can be used to form a protective film using $C_2H_4$, and a magnetic recording medium can be formed by a nitrogenation treatment incorporating nitrogen into the surface within the same chamber. Subsequently, for example, PFPE (polyfluoropolyether) can be coated on the protective layer by the dip coating method to form a lubricating layer.

Further, a soft magnetic layer, seed layer, intermediate layer, or the like can be formed between the undercoat layer and the magnetic layer by a known film-forming method such as sputtering method (DC magnetron sputtering method, RF magnetron sputtering method, or the like) or vacuum vapor deposition.

Reference can be made, for example, to paragraphs [0027] to [0032] of Japanese Unexamined Patent Publication (KOKAI) No. 2009-110626, which is expressly incorporated herein by reference in its entirety. A heat sink layer comprised of a material of high thermoconductivity can be formed between the glass substrate and the soft magnetic layer, the details of which are given further below.

As set forth above, to achieve higher density recording on a magnetic recording medium, the magnetic recording layer is desirably formed of a magnetic material of high Ku. Examples of magnetic materials that are desirable from this perspective are Fe—Pt-based magnetic materials, Co—Pt-based magnetic materials and Fe—Co—Pt-based magnetic materials. In this context, the term "based" means containing. That is, in the magnetic recording medium of the present invention, a magnetic recording layer in the form of a magnetic recording layer containing Fe and Pt, Co and Pt, or Fe, Co and Pt is desirable. For example, the film-forming temperature of magnetic materials that have conventionally been widely employed, such as Co—Cr-based materials, is about 250 to 300° C. By contrast, the film-forming temperature of the above magnetic materials is normally a high temperature exceeding 500° C. Further, to impart a crystalline orientation to these magnetic films following film formation, they are normally subjected to a high-temperature heat treatment (annealing) at a temperature exceeding the film-forming temperature. Accordingly, when using Fe—Pt-based magnetic materials, Co—Pt-based magnetic materials, or Fe—Co—Pt-based magnetic materials to form a magnetic recording layer, the substrate is exposed to this high temperature. In that case, when the glass constituting the substrate has poor heat resistance, it deforms at the high temperature and flatness is lost. By contrast, the substrate that is contained in the magnetic recording medium of the present invention exhibits good heat resistance (with a glass transition temperature of equal to or higher than 600° C.). Thus, even following the formation of a magnetic recording layer using an Fe—Pt-based magnetic material, a Co—Pt-based magnetic material, or an Fe—Co—Pt-based magnetic material, a high degree of flatness can be retained. The magnetic recording layer can be formed, for example, by forming a film of Fe—Pt-based magnetic material, Co—Pt-based magnetic material, or Fe—Co—Pt-based magnetic material by DC magnetron sputtering in an Ar atmosphere and then conducting thermoprocessing at higher temperature in a heating furnace.

The Ku (crystal magnetic anisotropy energy constant) is proportional to the coercivity Hc. "Coercivity Hc" denotes the strength of the magnetic field that reverses the magnetization. As set forth above, magnetic materials of high Ku have resistance to thermal fluctuation. Thus, they are known to be materials in which magnetized regions tend not to deteriorate due to thermal fluctuation, even when extremely minute magnetic particles are employed, and are thus suited to high-density recording. However, since Ku and Hc are proportional, as stated above, the higher the Ku, the higher the Hc. That is, the reversal of magnetization by the magnetic head tends not to occur and the writing of information becomes difficult. Accordingly, the recording method of assisting the reversal of magnetization of a magnetic material of high Ku by instantaneously applying energy to the data writing region through the head to lower the coercivity when writing information with a magnetic head has gathered attention in recent years. Such recording methods are referred to as "energy-assisted recording methods." Among them, the recording method of assisting the reversal of magnetization by irradiating a laser beam is referred to as the "heat-assisted recording method," and the recording method that provides assistance by means of microwaves is referred to as the "microwave-assisted recording method". As set forth above, the present invention permits the formation of a magnetic recording layer with a magnetic material of high Ku. Thus, by combining a magnetic material of high Ku with energy-assisted recording, for example, it is possible to achieve high-density recording in which the surface recording density exceeds one terabyte/inch$^2$. That is, the magnetic recording medium of the present invention is preferably employed in an energy-assisted recording method. Heat-assisted recording methods are described in detail, for example, in IEEE Transactions on Magnetics, Vol. 44, No. 1, January 2008 119, and microwave-assisted recording methods are described in detail in, for example, IEEE Transactions on Magnetics, Vol. 44, No. 1, January 2008 125. Energy-assisted recording can also be conducted in the present invention by the methods described in these documents, which are expressly incorporated herein by reference in their entirety.

The dimensions of the glass substrate for a magnetic recording medium (for example, the glass substrate for a magnetic, disk) and those of the magnetic recording medium (for example, a magnetic disk) of the present invention are not specifically limited. Because they are capable of high-density recording, the medium and substrate can be miniaturized. For example, they can be in the shape with nominal diameters of 2.5 inches and even smaller (such as one inch, 1.8 inches), or 3 inches, 3.5 inches or the like.

The method of manufacturing the glass substrate will be described below.

First, to achieve the desired glass composition, glass starting materials such as oxides, carbonates, nitrates, sulfates, and hydroxides are weighed out and dispersed; thoroughly stirring the mixture; heating and melting the mixture within a range of 1,400 to 1,600° C., for example, in a melting vessel; clarifying and stirring the melt to adequately remove bubbles to form the homogenized glass melt. Clarifying agents can be added to the glass starting materials other than the other components, as needed. Sn oxide and Ce oxide are desirably employed as clarifying agents because of the following reasons.

Sn oxide releases oxygen gas at high temperature during melting of the glass, takes in minute bubbles contained in the glass and converts them to large bubbles so that they tend to rise, thereby functioning well to promote clarification. Additionally, Ce oxide incorporates as a glass component oxygen that is present as a gas in the glass at low temperature, thereby functioning well to eliminate bubbles. When the size of the bubbles (the size of the bubbles (voids) remaining in the glass upon solidification) falls within the range of equal to or lower than 0.3 mm, the action of Sn oxide in eliminating both relatively large and extremely small bubbles is strong. When Ce oxide is added with Sn oxide, the density of bubbles from about 50 µm to 0.3 mm in size is greatly reduced to about one part in several tens of parts. Causing both Sn oxide and Ce oxide to be present together in this manner can increase the clarifying effect on the glass over a wide temperature range running from the high temperature region to the low temperature region. Thus, it is desirable to add Sn oxide and Ce oxide.

When the total quantity of Sn oxide and Ce oxide that is added relative to the total of the other components is equal to or greater than 0.02 mass percent, an adequate clarifying effect can be anticipated. When a substrate is prepared using glass containing even trace or small quantities of unmelted material, and the unmelted material appears on the surface of the glass substrate due to polishing, protrusions are generated on the glass substrate surface and portions where the unreacted material drops out become pits. The smoothness of the glass substrate surface is lost, and the substrate cannot be used for a magnetic recording medium. By contrast, when the total quantity of Sn oxide and Ce oxide added relative to the total of the other components is equal to or less than 3.5 mass percent, they can dissolve adequately into the glass and prevent the incorporation of unmelted material.

When preparing crystallized glass, Sn and Ce function to produce crystal nuclei. Since the glass substrate of the present invention is comprised of amorphous glass, it is desirable not to cause crystals to precipitate by heating. When the quantities of Sn and Ce are excessive, such precipitation of crystals tends to occur. Thus, the addition of an excessive quantity of Sn oxide or Ce oxide is to be avoided.

From the above perspectives, the total quantity of Sn oxide and Ce oxide added relative to the total of the other components is desirably 0.02 to 3.5 mass percent. The total quantity of Sn oxide and Ce oxide added relative to the total of the other components preferably falls within a range of 0.1 to 2.5 mass percent, more preferably a range of 0.1 to 1.5 mass percent, and still more preferably, within a range of 0.5 to 1.5 mass percent.

The use of $SnO_2$ as the Sn oxide is desirable to effectively release oxygen gas from the glass melt at high temperature.

Sulfates can also be added as clarifying agents in a range of 0 to 1 mass percent relative to the total of the other components. However, there is a risk of melted material in the glass melt being blown off. In that case, foreign material increases markedly in the glass. Therefore, when such blowing off is concerned, it is desirable not to incorporate sulfates. Other than the above clarifying agents, components that have a clarifying effect without diminishing the object of the present invention can be employed. However, it is better not to add As having large environmental load, as described above. In addition, Sb is also desirably not employed from the perspective of environmental load.

Next, the glass molded product in the form of substrate, that is, the glass substrate blank for a magnetic recording medium of the present invention, can be obtained by molding the glass melt prepared with a method of press molding, down draw, or floating into a plate shape; and employing a step of processing the plate-shaped glass obtained.

In the press molding method, an outflowing glass melt is cut to obtain a desired glass melt gob. The glass gob is then press molded with a pressing mold to prepare a thin disk-shaped substrate blank.

In the down draw method, a gutter-shaped molded member is employed to guide the glass melt, the glass melt is caused to overflow to the two sides of the molded member, two streams of glass melt flowing downward along the molded member are caused to flow together beneath the molded member and then drawn downward and molded into a sheet form. This method is also referred to as the fusion method. The surfaces of the glass that has contacted the molded member are laminated together to obtain sheet glass without contact traces. Subsequently, thin disk-shaped substrate blanks are cut out of the sheet material obtained.

In the floating method, a glass melt is caused to flow out onto a float bath of accumulated molten tin or the like, and molded into sheet glass while being drawn. Subsequently, thin disk-shaped substrate blanks are cut out of the sheet material obtained.

A center hole is provided in the substrate blank thus obtained, the inner and outer circumferences thereof are processed, and the two main surfaces thereof are lapped and polished. Next, a cleaning step comprising acid cleaning and alkali cleaning is conducted to obtain a disk-shaped substrate.

In the present invention, the term "main surface" means the surface of a substrate on which a magnetic recording layer is to be provided or has been provided. Since such surfaces are those with the largest area among the surfaces of the substrate of a magnetic recording medium, they are called main surfaces. In the case of a disk-shaped magnetic recording medium, they correspond to the surface of the circular shape of the disk (excluding the center hole when present).

Since the glass substrate of the present invention is imparted with a good chemical strengthening property by the above adjustment of the composition, an ion-exchange layer can be readily formed on the surface by means of a chemical strengthening treatment. That is, an ion-exchange layer can be present over a part or all of the surface of the glass substrate of the present invention. The ion-exchange layer can be formed by bringing an alkali salt into contact with the surface of the substrate at high temperature to exchange the alkali metal ions in the alkali salt with alkali metal ions in the substrate. In a common ion exchange, an alkali nitrate is heated to obtain molten salt, and the substrate is immersed in the molten salt. By replacing alkali metal ions of small ionic radius in the substrate with alkali metal ions of large ionic radius, a compressive stress layer is formed in the substrate surface. This can enhance the fracture durability of the substrate and improves reliability. For example, immersion of the glass substrate in molten salt in the form of potassium nitrate causes the Li ions and Na ions in the substrate to be replaced with K ions in the molten salt, forming an ion-exchange layer on the surface of the substrate. The ion exchange can also reduce the quantity of alkali eluting out of the substrate surface. In chemical strengthening, the ion exchange is desirably conducted at a temperature that is higher than the distortion point of the glass constituting the substrate but lower than the glass transition temperature within a temperature range at which the molten alkali salt does not thermally decompose. The presence of an ion-exchange layer on the substrate can be confirmed by observing the cross-section of the glass (along a plane passing through the ion-exchange layer) by the Babinet's method, the method of measuring the concentration distribution of the alkali metal ions from the glass surface in the direction of depth, or the like.

When the glass constituting the substrate of the present invention contains $Li_2O$ as an essential component as set forth above, the ion exchange desirably consists of an exchange of one or more alkali metal ion selected from the group consisting of Na, K, Rb, and Cs, which have greater ionic radii than Li.

Magnetic recording media with outer diameters of 2.5 inches are normally employed in the HDDs used in laptop computers. The sheet thickness of the glass employed therein has conventionally been 0.635 mm. To further enhance impact resistance and increase the rigidity of the substrate without changing the specific modulus of elasticity, the use of a sheet thickness of equal to or more than 0.7 mm is desirable, and a sheet thickness of equal to or more than 0.8 mm is preferred.

The main surface on which a magnetic recording layer is formed desirably has surface properties (1) to (3) below (1) an arithmetic average surface roughness Ra measured over an area of 1 µm×1 µm by an atomic force microscope at a resolution of 512×256 pixels of equal to or lower than 0.15 nm;

(2) an arithmetic average surface roughness Ra measured over an area of 5 µm×5 µm of equal to or lower than 0.12 nm;

(3) an arithmetic average surface waviness Wa at a wavelength of 100 µm to 950 µm of equal to or lower than 0.5 nm.

The grain size of the magnetic recording layer that is formed on the substrate is, for example, less than 10 nm in a vertical recording method. To increase the recording density, even when a minute bit size is employed, no improvement in magnetic characteristics can be anticipated when the surface roughness of the substrate is high. By contrast, a substrate in which the arithmetic averages Ra of the two types of surface roughens of (1) and (2) above fall within the above-stated ranges permits improvement in magnetic characteristics even when a minute bit size is employed to achieve a high recording density. Keeping the arithmetic average of surface waviness Wa of (3) above within the stated range permits enhancement of the floating stability of the magnetic head in an HDD. The acid resistance and alkali resistance of the glass are effective for achieving a substrate having surface properties (1) to (3) described above.

The magnetic recording medium of the present invention can be called a magnetic disk, hard disk, or the like. It is suited to use in an internal memory apparatus (fixed disk or the like) such as a desktop computer, server-use computer, laptop computer, or mobile computer; internal memory apparatus such as a portable recording and reproduction apparatus that records and reproduces images and/or sound; vehicle-mounted audio recording and reproduction apparatuses; and the like. As described above, it is particularly suited to the energy-assisted recording method.

EXAMPLES

The present invention is described in greater detail below through Examples. However, the present invention is not limited to the embodiments shown in Examples.

(1) Preparation of Glass Melts

Starting materials such as oxides, carbonates, nitrates, and hydroxides were weighed out and mixed to obtain blended starting materials in a manner calculated to yield glasses of the compositions shown in Table 1. Each of the starting materials was charged to a melting vessel and heated, melted, clarified, and stirred for 3 to 6 hours within a range of 1,400 to 1,600° C. to prepare a homogenous glass melt containing no bubbles or unmelted matter. No bubbles, unmelted material, crystal precipitation, or contaminants in the form of flame-resistant material constituting the melting vessel were found in the glasses obtained.

(2) Preparation of Substrate Blanks

Next, disk-shaped substrate blanks were prepared by methods A and B below.

(Method A)

The above glass melt that had been clarified and homogenized was caused to flow out of a pipe at a constant flow rate and received in the lower mold of a pressing mold. The outflowing glass melt was cut with a cutting blade to obtain a glass melt gob of prescribed weight on the lower mold. The lower mold carrying the glass melt gob was then immediately removed from beneath the pipe. Using an upper mold facing the lower mold and a sleeve mold, the glass melt was press molded into a thin disk shape measuring 66 mm in diameter and 2 mm in thickness. The press-molded article was cooled to a temperature at which it would not deform, removed from the mold, and annealed, yielding a substrate blank. In the molding, multiple lower molds were used and the outflowing glass melt was continuously molded into disk-shaped substrate blanks.

(Method B)

The glass melt that had been clarified and homogenized was continuously cast from above into the through-holes of a heat-resistant casting mold provided with round through-holes, molded into round rods, and brought out from beneath the through holes. The glass that was brought out was annealed. The glass was then sliced at constant intervals in a direction perpendicular to the axis of the round rods using a multiwire saw to prepare disk-shaped substrate blanks.

Methods A and B were employed in the present Examples. However, methods C and D, described below, are also suitable as methods for manufacturing disk-shaped substrate blanks.

(Method C)

The above glass melt is caused to flow out onto a float bath, molded into sheet glass (molded by the floating method), and then annealed. Disk-shaped pieces of glass can be then cut from the sheet glass to obtain substrate blanks.

(Method D)

The above glass melt is molded into sheet glass by the overflow down draw method (fusion method) and annealed. Disk-shaped pieces of glass can be then cut from the sheet glass to obtain substrate blanks.

(3) Preparation of Glass Substrates

Through-holes were formed in the center of substrate blanks obtained by the various above methods. The inner and outer circumferences thereof were ground and the main surfaces of the disks were lapped and polished (polished to mirror surfaces) to finish them into magnetic disk-use glass substrates 65 mm in diameter and 0.8 mm in thickness. The glass substrates obtained were cleaned with a 1.7 mass percent hydrofluosilicic acid ($H_2SiF$) aqueous solution and a 1 mass percent potassium hydroxide aqueous solution. They were then rinsed with pure water and dried. The surfaces of the substrates prepared from the glass of Examples were observed under magnification, revealing no surface roughness. The surfaces were smooth.

In (4) below, disk-shaped glass substrates prepared by the above-described method were used without any change to prepare magnetic disks. Separately, disk-shaped glass substrates prepared by the same method as above were immersed in a mixed molten salt of sodium nitrate and potassium nitrate to obtain glass substrates having an ion-exchange layer produced by ion exchange (chemical strengthening) on the surfaces thereof. Conditions of the chemical strengthening are given in Table 2. Such ion-exchange processing (chemical strengthening processing) is effective to increase the impact resistance of the glass substrate. The cross-sections (planes passing through the ion-exchange layer) of glass substrates sampled from multiple glass substrate subjected to ion-exchange processing were observed by the Babinet's method, revealing the formation of ion-exchange layers.

In the above example, the substrates were immersed in a mixed molten salt of sodium nitrate and potassium nitrate to prepare glass substrates having ion-exchange layers. Instead of a mixed molten salt of sodium nitrate and potassium nitrate, ion-exchange layers can also be formed by conducing ion-exchange processing by immersing the glass substrate in any one of:

(A) a mixed molten salt of a potassium compound and a rubidium compound;

(B) a mixed molten salt of a potassium compound and a cesium compound;

(C) a mixed molten salt of a rubidium compound and a cesium compound;

(D) a mixed molten salt of a potassium compound, rubidium compound, and cesium compound;

(E) the molten salt of a rubidium compound; or (F) the molten salt of a cesium compound.

Nitrates can be employed, for example, as the molten salt. The ion-exchange layer can be formed over the entire region of the glass substrate surface, formed over just the outer circumferential surface thereof, or formed over just the outer circumferential surface and inner circumferential surface thereof.

(4) Formation of Magnetic Disks

The following method was used to sequentially form an adhesive layer, undercoat layer, magnetic layer, protective layer, and lubricating layer on the main surface of each of the glass substrates obtained from the glasses of Examples, yielding magnetic disks.

First, a film-forming apparatus in which a vacuum had been drawn was employed to sequentially form the adhesive layer, undercoat layer, and magnetic layer in an Ar atmosphere by the DC magnetron sputtering method.

At the time, the adhesive layer was formed as an amorphous CrTi layer 20 nm in thickness using a CrTi target. Next, a single-substrate, static opposed type film-forming apparatus was employed to form a layer 10 nm in thickness comprised of CrRu as an undercoat layer by the DC magnetron sputtering method in an Ar atmosphere. Further, the magnetic layer was formed at a film forming temperature of 400° C. using an FePt or CoPt target to obtain an FePt or CoPt layer 10 nm in thickness.

The magnetic disks on which magnetic layers had been formed were moved from the film-forming apparatus into a heating furnace and annealed at a temperature of 650 to 700° C.

Next, a 3 nm protective layer comprised of hydrogenated carbon was formed by CVD method using ethylene as the material gas. Subsequently, PFPE (perfluoropolyether) was used to form a lubricating layer by the dip coating method. The lubricating layer was 1 nm in thickness.

The above manufacturing process yielded magnetic disks.

1. Evaluation of the Glass (1) Glass Transition Temperature Tg and Coefficient of Thermal Expansion The glass transition temperature Tg and average coefficient of linear expansion α at 100 to 300° C. of a sample that had been processed into a sheet and subjected to chemical strengthening under the conditions given in Table 2 were measured with a thermomechanical analyzer made by Rigaku (Thermo plus TMA8310).

(2) Young's Modulus

The Young's modulus of a sample that had been processed into a sheet and subjected to a chemical strengthening treatment under the conditions given in Table 2 was measured by an ultrasonic method.

(3) Specific Gravity

The specific gravity of a sample that had been processed into a sheet and subjected to a chemical strengthening treatment under the conditions given in Table 2 was measured by Archimedes' method.

(4) Specific Modulus of Elasticity

The specific modulus of elasticity was calculated from the Young's modulus obtained in (2) and the specific gravity obtained in (3).

(5) Fracture Toughness Value

Using an MVK-E apparatus made by Akashi, a Vicker's indenter was pressed with a load of 9.81 N into a sample that had been processed into a sheet and subjected to a chemical strengthening treatment under the conditions given in Table 2, imparting an indentation and cracks to the sample.

The Vicker's indenter was also pressed in at a load of 4.9 N to impart an indentation and cracks to the sample.

The Young's modulus E [GPa], diagonal length of indentation, and surface crack half-length were measured, and the fracture toughness value $K_{1c}$ was calculated from the load and the Young's modulus of the sample.

2. Substrate Evaluation (Surface Roughness, Surface Waviness)

A square area measuring 5 μm×5 μm of the main surface (surface on which the magnetic recording layer and the like were laminated) of each substrate before and after chemical strengthening treatment was observed by an atomic force microscope (AFM) at a resolution of 256×256 pixels, and the arithmetic average Ra of the surface roughness measured at a resolution of 512×256 pixels over an area of 1 μm×1 μM, the arithmetic average Ra of the surface roughness measured over an area of 5 μm×5 μm, and the arithmetic average of the surface waviness Wa at wavelengths of 100 μm to 950 μm were measured.

The arithmetic average Ra of the surface roughness measured over an area of 1 μm×1 μm was a range of 0.05 to 0.15 nm, the arithmetic average Ra of the surface roughness measured over an area of 5 μm×5 μm was a range of 0.03 to 0.12 nm, and the arithmetic average of the surface waviness Wa at wavelengths of 100 μm to 950 μm was 0.2 to 0.5 nm. These ranges presented no problems as substrates for magnetic recording media of high recording density.

TABLE 1

| Glass composition | Mole percent | Mass percent |
| --- | --- | --- |
| $SiO_2$ | 64.0 | 60.9 |
| $Al_2O_3$ | 5.0 | 8.1 |
| $Li_2O$ | 1.5 | 0.7 |
| $Na_2O$ | 8.5 | 8.3 |
| $K_2O$ | 0.0 | 0.0 |
| MgO | 4.0 | 2.6 |
| CaO | 13.0 | 11.6 |
| BaO | 0.0 | 0.0 |
| $ZrO_2$ | 4.0 | 7.8 |
| Total | 100 | 100 |

TABLE 2

| | Chemical strengthening condition | | | | Fracture toughness value $K_{1c}[MPa \cdot m^{1/2}]$ | | | | | | |
| --- | --- | --- | --- | --- | --- | --- | --- | --- | --- | --- | --- |
| | | | Molten salt | | Load | Load | | Glass transition | Aerage coefficient of linear expansion | | Specific modulus |
| | Temp. | Period | | | 9.81N | 4.9N | Specific | temp. | α at 100 to | Young's | of |
| No. | [° C.] | [hrs] | $KNO_3$ | $NaNO_3$ | (1000 gf) | (500 gf) | gravity | Tg | 300° C. | modulus | elasticity |
| 1 | 400 | 4 | 60% | 40% | 1.1 | — | 2.67 | 633° C. | $77 \times 10^{-7}/°$ C. | 87.5 GPa | 32.8 MNm/kg |
| 2 | 400 | 2 | 60% | 40% | 1.0 | — | 2.67 | 633° C. | $77 \times 10^{-7}/°$ C. | 87.5 GPa | 32.8 MNm/kg |
| 3 | 450 | 4 | 60% | 40% | 1.2 | 1.3 | 2.67 | 633° C. | $77 \times 10^{-7}/°$ C. | 87.5 GPa | 32.8 MNm/kg |
| 4 | 400 | 4 | 80% | 20% | 1.1 | — | 2.67 | 633° C. | $77 \times 10^{-7}/°$ C. | 87.5 GPa | 32.8 MNm/kg |
| 5 | 420 | 4 | 80% | 20% | 1.2 | 1.3 | 2.67 | 633° C. | $77 \times 10^{-7}/°$ C. | 87.5 GPa | 32.8 MNm/kg |
| 6 | 420 | 6 | 80% | 20% | 1.1 | — | 2.67 | 633° C. | $77 \times 10^{-7}/°$ C. | 87.5 GPa | 32.8 MNm/kg |
| 7 | 420 | 2 | 80% | 20% | 1.0 | — | 2.67 | 633° C. | $77 \times 10^{-7}/°$ C. | 87.5 GPa | 32.8 MNm/kg |
| 8 | 500 | 4 | 100% | 0% | 1.1 | — | 2.67 | 633° C. | $77 \times 10^{-7}/°$ C. | 87.5 GPa | 32.8 MNm/kg |
| 9 | 500 | 2 | 100% | 0% | 1.0 | — | 2.67 | 633° C. | $77 \times 10^{-7}/°$ C. | 87.5 GPa | 32.8 MNm/kg |

With the exceptions that the glass compositions were changed to those shown in Tables 3 to 5 and the chemical strengthening treatment was conducted under the conditions given in the same tables, the same steps as above were implemented and identical evaluation was conducted. To confirm the change in the fracture toughness value due to the chemical strengthening treatment, the fracture toughness value was also measured by the above method for the glasses prior to the chemical strengthening treatment.

[Table 3]

TABLE 3

| | Component (mole %) | No. 10 | No. 11 | No. 12 | No. 13 | No. 14 | No. 15 | No. 16 |
|---|---|---|---|---|---|---|---|---|
| Glass composition | $SiO_2$ | 57.00 | 59.00 | 60.00 | 59.00 | 60.00 | 61.00 | 60.00 |
| | $Al_2O_3$ | 12.00 | 13.00 | 12.00 | 12.00 | 12.00 | 11.00 | 11.00 |
| | $B_2O_3$ | 0.00 | 0.00 | 0.00 | 0.00 | 0.00 | 0.00 | 0.00 |
| | $Li_2O$ | 0.00 | 0.00 | 0.00 | 0.00 | 0.00 | 1.00 | 1.00 |
| | $Na_2O$ | 12.00 | 12.00 | 12.00 | 13.00 | 10.00 | 10.50 | 11.00 |
| | $K_2O$ | 0.00 | 0.00 | 0.00 | 0.00 | 2.00 | 0.00 | 0.00 |
| | MgO | 18.00 | 15.00 | 15.00 | 15.00 | 15.00 | 15.50 | 16.00 |
| | CaO | 0.00 | 0.00 | 0.00 | 0.00 | 0.00 | 0.00 | 0.00 |
| | SrO | 0.00 | 0.00 | 0.00 | 0.00 | 0.00 | 0.00 | 0.00 |
| | BaO | 0.00 | 0.00 | 0.00 | 0.00 | 0.00 | 0.00 | 0.00 |
| | ZnO | 0.00 | 0.00 | 0.00 | 0.00 | 0.00 | 0.00 | 0.00 |
| | $ZrO2$ | 1.00 | 1.00 | 1.00 | 1.00 | 1.00 | 1.00 | 1.00 |
| | $TiO_2$ | 0.00 | 0.00 | 0.00 | 0.00 | 0.00 | 0.00 | 0.00 |
| | Total | 100.00 | 100.00 | 100.00 | 100.00 | 100.00 | 100.00 | 100.00 |
| Characteristics | Specific gravity | 2.54 | 2.56 | 2.54 | 2.54 | 2.53 | 2.53 | 2.54 |
| | Glass transition temp.(° C.) | 700 | 696 | 697 | 683 | 700 | 680 | 673 |
| | Average coefficient of linear expansion ($\times 10^{-7}$/° C.) (100~300° C.) | 75 | 74 | 75 | 76 | 78 | 70 | 77 |
| | Young's modulus (GPa) | 82 | 83 | 81 | 81 | 81 | 83 | 84 |
| | Specific modulus of elasticity (MNm/kg)) | 32 | 33 | 32 | 32 | 32 | 33 | 33 |
| Fracture toughness value $[MPa \cdot m^{1/2}]$ (Product not strengthened) | Load 9.81N(1000 gf) | 0.81 | 0.80 | 0.79 | 0.79 | 0.77 | 0.81 | 0.80 |
| | Load 4.9N(500 gf) | 0.81 | 0.80 | 0.79 | 0.79 | 0.77 | 0.81 | 0.80 |
| Strengthening conditions | Temp. [° C.] | 450 | 450 | 450 | 450 | 450 | 450 | 450 |
| | Period [hrs] | 4 | 4 | 4 | 4 | 4 | 4 | 4 |
| | Molten salt | | | | | | | |
| | $KNO_3$ [%] | 100 | 100 | 100 | 100 | 100 | 60 | 60 |
| | $NaNO_3$ [%] | 0 | 0 | 0 | 0 | 0 | 40 | 40 |
| Fracture toughness value $[MPa \cdot m^{1/2}]$ (Strengthened product) | Load 9.81N(1000 gf) | 1.52 | 1.53 | 1.52 | 1.55 | 1.20 | 1.80 | 1.78 |
| | Load 4.9N(500 gf) | 1.51 | 1.55 | 1.52 | 1.55 | 1.33 | 2.15 | 2.11 |
| | Klc (after)/Klc (before) | 1.88 | 1.91 | 1.92 | 1.96 | 1.58 | 2.22 | 2.23 |

(Note)
Each of Klc (before) and Klc (after) means a fracture toughness value before or after chemical strengthening (at a load of 9.81N (1000 gf)).

TABLE 4

| | No. 17 | No. 18 | No. 19 | No. 20 | No. 21 | No. 22 | No. 23 | No. 24 |
|---|---|---|---|---|---|---|---|---|
| Glass composition (mole %) | | | | | | | | |
| $SiO_2$ | 64.00 | 63.00 | 64.00 | 64.00 | 60.00 | 64.00 | 65.00 | 65.00 |
| $B_2O_3$ | 0.00 | 0.00 | 0.00 | 0.00 | 0.00 | 0.00 | 0.00 | 0.00 |
| $Al_2O_3$ | 5.00 | 6.00 | 6.00 | 5.00 | 9.00 | 6.00 | 6.00 | 6.00 |
| $Li_2O$ | 1.50 | 1.50 | 1.50 | 1.50 | 1.50 | 1.50 | 1.50 | 1.50 |
| $Na_2O$ | 8.50 | 8.50 | 8.50 | 8.50 | 8.50 | 8.00 | 8.00 | 8.00 |
| $K_2O$ | 0.00 | 0.00 | 0.00 | 0.00 | 0.00 | 0.00 | 0.00 | 0.00 |
| MgO | 4.00 | 4.00 | 10.00 | 13.00 | 2.00 | 3.00 | 2.00 | 1.00 |
| CaO | 13.00 | 13.00 | 7.00 | 4.00 | 15.00 | 13.50 | 13.50 | 14.50 |
| SrO | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| $ZrO_2$ | 4.00 | 4.00 | 4.00 | 4.00 | 4.00 | 4.00 | 4.00 | 4.00 |
| $TiO2$ | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 |
| $Yb_2O_3$ | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 |
| $Gd_2O_3$ | 0.00 | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 | 0.00 |
| $Ta_2O_5$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| Glass transition temp. Tg (° C.) | 633 | ≥830 | 639 | 650 | 658 | 646 | 646 | 651 |
| Average coefficient of linear expansion ($\times 10^{-7}$/° C.) (100~300° C.) | 77 | ≥75 | 72 | 70 | 74 | 75 | 74 | 74 |

TABLE 4-continued

| | | | | | | | | | |
|---|---|---|---|---|---|---|---|---|---|
| Young's modulus (GPa) | | 87.5 | 87.8 | 87.9 | 88.3 | 88.8 | 87.6 | 86.7 | 86.8 |
| Specific modulus of elasticity (MNm/kg)) | | 32.8 | 32.9 | 33.3 | 33.5 | 33.0 | 32.8 | 32.6 | 32.6 |
| Specific gravity | | 2.67 | 2.67 | 2.64 | 2.63 | 2.69 | 2.67 | 2.66 | 2.66 |
| Fracture toughness value $[MPa \cdot m^{1/2}]$ (Product not strengthened) | Load 9.81N (1000 gf) | 0.70 | 0.71 | 0.70 | 0.68 | 0.73 | 0.69 | 0.70 | 0.70 |
| | Load 4.9N (500 gf) | 0.70 | 0.70 | 0.70 | 0.70 | 0.74 | 0.69 | 0.69 | 0.70 |
| Strengthening conditions | Temp. [° C.] | 450 | 450 | 450 | 450 | 450 | 450 | 450 | 450 |
| | Period [hrs] | 4 | 4 | 4 | 4 | 4 | 4 | 4 | 4 |
| | Molten salt | | | | | | | | |
| | KNO3 [%] | 60 | 60 | 60 | 60 | 60 | 60 | 60 | 60 |
| | NaNO3 [%] | 40 | 40 | 40 | 40 | 40 | 40 | 40 | 40 |
| Fracture toughness value $[MP \cdot m^{1/2}]$ (Strengthened product) | Load 9.81N (1000 gf) | 1.20 | 1.19 | 1.09 | 1.06 | 1.29 | 1.11 | 1.18 | 1.21 |
| | Load 4.9N (500 gf) | 1.30 | 1.33 | 1.48 | 1.31 | 1.52 | 1.32 | 1.30 | 1.33 |
| Klc (after)/Klc (before) | | 1.714288 | 1.676056 | 1.557143 | 1.558824 | 1.767123 | 1.608696 | 1.685714 | 1.728571 |

| | | No. 25 | No. 26 | No. 27 | No. 28 | No. 29 | No. 30 | No. 31 | No. 32 |
|---|---|---|---|---|---|---|---|---|---|
| Glass composition (mole %) | | | | | | | | | |
| $SiO_2$ | | 65.00 | 65.00 | 65.00 | 64.00 | 64.00 | 64.00 | 63.00 | 65.00 |
| $B_2O_3$ | | 0.00 | 0.00 | 0.00 | 0.00 | 0.00 | 0.00 | 0.00 | 0.00 |
| $Al_2O_3$ | | 8.00 | 6.00 | 6.00 | 5.00 | 5.00 | 5.00 | 6.00 | 6.00 |
| $Li_2O$ | | 1.50 | 1.50 | 1.50 | 1.50 | 1.50 | 1.50 | 1.00 | 2.00 |
| $Na_2O$ | | 8.00 | 8.00 | 8.00 | 8.50 | 8.50 | 8.50 | 8.00 | 6.50 |
| $K_2O$ | | 0.00 | 0.00 | 0.00 | 0.00 | 0.00 | 0.00 | 1.00 | 1.00 |
| MgO | | 0.00 | 1.00 | 0.00 | 2.00 | 4.00 | 4.00 | 4.00 | 1.50 |
| CaO | | 15.50 | 13.50 | 13.50 | 13.00 | 13.00 | 13.00 | 13.00 | 14.00 |
| SrO | | 0.00 | 1.00 | 2.00 | 2.00 | 0.00 | 0.00 | 0.00 | 0.00 |
| BaO | | 0.00 | 0.00 | 0.00 | 0.00 | 0.00 | 0.00 | 0.00 | 0.00 |
| ZnO | | 0.00 | 0.00 | 0.00 | 0.00 | 0.00 | 2.00 | 0.00 | 0.00 |
| $ZrO_2$ | | 4.00 | 4.00 | 4.00 | 4.00 | 2.00 | 2.00 | 4.00 | 4.00 |
| $TiO_2$ | | 0.00 | 0.00 | 0.00 | 0.00 | 2.00 | 0.00 | 0.00 | 0.00 |
| $Y_2O_4$ | | 0.00 | 0.00 | 0.00 | 0.00 | 0.00 | 0.00 | 0.00 | 0.00 |
| $Yb_2O_3$ | | 0.00 | 0.00 | 0.00 | 0.00 | 0.00 | 0.00 | 0.00 | 0.00 |
| $La_2O_3$ | | 0.00 | 0.00 | 0.00 | 0.00 | 0.00 | 0.00 | 0.00 | 0.00 |
| $Gd_2O_3$ | | 0.00 | 0.00 | 0.00 | 0.00 | 0.00 | 0.00 | 0.00 | 0.00 |
| $Nb_2O_5$ | | 0.00 | 0.00 | 0.00 | 0.00 | 0.00 | 0.00 | 0.00 | 0.00 |
| $Ta_2O_5$ | | 0.00 | 0.00 | 0.00 | 0.00 | 0.00 | 0.00 | 0.00 | 0.00 |
| Total | | 100.00 | 100.00 | 100.00 | 10000 | 100.00 | 100.00 | 100.00 | 100.00 |
| Glass transition temp. Tg (° C.) | | 656 | 645 | ≥620 | 620 | 620 | 605 | 650 | 640 |
| Average coefficient of linear expansion ($\times 10^{-7}$/° C.) (100~300° C.) | | 75 | 74 | >70 | 79 | 80 | 75 | 81 | 77 |
| Young's modulus (GPa) | | 86.4 | 87.0 | 86.7 | 87.5 | 86.3 | 85.6 | 87.5 | 87.5 |
| Specific modulus of elasticity (MNm/kg)) | | 32.4 | 32.4 | 32.1 | 32.3 | 32.8 | 32.3 | 32.8 | 33.0 |
| Specific gravity | | 2.68 | 2.88 | 2.70 | 2.71 | 2.63 | 2.65 | 2.66 | 2.65 |
| Fracture toughness value $[MPa \cdot m^{1/2}]$ (Product not strengthened) | Load 9.81N (1000 gf) | 0.70 | 0.70 | 0.69 | 0.70 | 0.70 | 0.70 | 0.71 | 0.70 |
| | Load 4.9N (500 gf) | 0.70 | 0.70 | 0.70 | 0.71 | 0.69 | 0.70 | 0.71 | 0.70 |
| Strengthening conditions | Temp. [° C.] | 450 | 450 | 450 | 450 | 450 | 450 | 450 | 450 |
| | Period [hrs] | 4 | 4 | 4 | 4 | 4 | 4 | 4 | 4 |
| | Molten salt | | | | | | | | |
| | KNO3 [%] | 60 | 60 | 60 | 60 | 60 | 60 | 60 | 60 |
| | NaNO3 [%] | 40 | 40 | 40 | 40 | 40 | 40 | 40 | 40 |
| Fracture toughness value $[MPa \cdot m^{1/2}]$ (Strengthened product) | Load 9.81N (1000 gf) | 1.20 | 1.22 | 1.24 | 1.09 | 1.13 | 1.13 | 1.12 | 1.20 |
| | Load 4.9N (500 gf) | 1.42 | 1.32 | 1.34 | 1.30 | 1.31 | 1.30 | 1.34 | 1.35 |
| Klc (after)/Klc (before) | | 1.714286 | 1.742657 | 1.797101 | 1.557143 | 1.614286 | 1.614286 | 1.577465 | 1.714286 |

TABLE 4-continued

|  |  | No. 33 | No. 34 | No. 35 | No. 36 | No. 37 | No. 38 | No. 39 | No. 40 |
|---|---|---|---|---|---|---|---|---|---|
| Glass composition (mole %) | | | | | | | | | |
| $SiO_2$ | | 67.00 | 65.00 | 65.00 | 64.00 | 64.00 | 63.00 | 64.00 | 64.00 |
| $B_2O_3$ | | 0.00 | 0.00 | 0.00 | 0.00 | 0.00 | 0.00 | 0.00 | 0.00 |
| $Al_2O_3$ | | 2.00 | 3.00 | 2.00 | 5.00 | 5.00 | 4.00 | 5.00 | 5.00 |
| $Li_2O$ | | 0.50 | 1.00 | 1.00 | 3.00 | 1.50 | 1.00 | 1.50 | 1.50 |
| $Na_2O$ | | 9.50 | 9.00 | 9.00 | 7.00 | 8.50 | 8.00 | 8.50 | 8.50 |
| $K_2O$ | | 0.00 | 1.00 | 1.00 | 0.00 | 0.00 | 0.00 | 0.00 | 0.00 |
| MgO | | 4.00 | 1.00 | 1.00 | 0.00 | 0.00 | 2.00 | 4.00 | 4.00 |
| CaO | | 13.00 | 15.00 | 15.00 | 17.00 | 17.00 | 18.00 | 13.00 | 13.00 |
| SrO | | 0.00 | 0.00 | 0.00 | 0.00 | 0.00 | 0.00 | 0.00 | 0.00 |
| BaO | | 0.00 | 0.00 | 0.00 | 0.00 | 0.00 | 0.00 | 0.00 | 0.00 |
| ZnO | | 0.00 | 0.00 | 0.00 | 0.00 | 0.00 | 0.00 | 0.00 | 0.00 |
| $ZrO_2$ | | 4.00 | 5.00 | 6.00 | 4.00 | 4.00 | 4.00 | 2.00 | 2.00 |
| $TiO_2$ | | 0.00 | 0.00 | 0.00 | 0.00 | 0.00 | 0.00 | 0.00 | 0.00 |
| $Y_2O_4$ | | 0.00 | 0.00 | 0.00 | 0.00 | 0.00 | 0.00 | 0.00 | 2.00 |
| $Yb_2O_3$ | | 0.00 | 0.00 | 0.00 | 0.00 | 0.00 | 0.00 | 0.00 | 0.00 |
| $La_2O_3$ | | 0.00 | 0.00 | 0.00 | 0.00 | 0.00 | 0.00 | 0.00 | 0.00 |
| $Gd_2O_3$ | | 0.00 | 0.00 | 0.00 | 0.00 | 0.00 | 0.00 | 0.00 | 0.00 |
| $Nb_2O_5$ | | 0.00 | 0.00 | 0.00 | 0.00 | 0.00 | 0.00 | 2.00 | 0.00 |
| $Ta_2O_5$ | | 0.00 | 0.00 | 0.00 | 0.00 | 0.00 | 0.00 | 0.00 | 0.00 |
| Total | | 100.00 | 100.00 | 100.00 | 100.00 | 100.00 | 100.00 | 100.00 | 100.00 |
| Glass transition temp. Tg (° C.) | | 630 | 638 | 640 | 622 | 645 | 646 | 632 | 639 |
| Average coefficient of linear expansion ($\times 10^{-7}/°$ C.) (100~300° C.) | | 79 | 83 | 83 | 80 | 85 | 77 | 78 | 78 |
| Young's modulus (GPa) | | 85.0 | 86.8 | 87.8 | 89.0 | 87.3 | 88.5 | 87.4 | 88.9 |
| Specific modulus of elasticity (MNm/kg)) | | 32.0 | 32.1 | 32.2 | 33.2 | 32.5 | 32.7 | 32.2 | 32.6 |
| Specific gravity | | 2.66 | 2.70 | 2.73 | 2.68 | 2.68 | 2.71 | 2.71 | 2.73 |
| Fracture toughness value [$MPa \cdot m^{1/2}$] (Product not strengthened) | Load 9.81N (1000 gf) | 0.70 | 0.70 | 0.70 | 0.70 | 0.65 | 0.67 | 0.70 | 0.70 |
| | Load 4.9N (500 gf) | 0.70 | 0.69 | 0.69 | 0.69 | 0.65 | 0.66 | 0.72 | 0.71 |
| Strengthening conditions | Temp. [° C.] | 450 | 450 | 450 | 450 | 450 | 450 | 450 | 450 |
| | Period [hrs] | 4 | 4 | 4 | 4 | 4 | 4 | 4 | 4 |
| | Molten salt | | | | | | | | |
| | KNO3 [%] | 60 | 60 | 60 | 60 | 60 | 60 | 60 | 60 |
| | NaNO3 [%] | 40 | 40 | 40 | 40 | 40 | 40 | 40 | 40 |
| Fracture toughness value [$MPa \cdot m^{1/2}$] (Strengthened product) | Load 9.81N (1000 gf) | 1.09 | 1.19 | 1.20 | 1.20 | 1.19 | 1.20 | 1.20 | 1.20 |
| | Load 4.9N (500 gf) | 1.32 | 1.30 | 1.33 | 1.32 | 1.30 | 1.31 | 1.30 | 1.31 |
| Klc (強)/Klc (前) | | 1.557143 | 1.7 | 1.714288 | 1.714286 | 1.630769 | 1.791045 | 1.714288 | 1.714288 |

|  | No. 41 | No. 42 | No. 43 | No. 44 | No. 45 | No. 46 | No. 47 | No. 48 |
|---|---|---|---|---|---|---|---|---|
| Glass composition (mole %) | | | | | | | | |
| $SiO_2$ | 64.00 | 64.00 | 64.00 | 64.00 | 62.00 | 64.00 | 64.00 | 64.00 |
| $B_2O_3$ | 0.00 | 0.00 | 0.00 | 0.00 | 0.00 | 0.00 | 0.00 | 0.00 |
| $Al_2O_3$ | 5.00 | 5.00 | 5.00 | 5.00 | 5.00 | 5.00 | 5.00 | 5.00 |
| $Li_2O$ | 1.50 | 1.50 | 1.50 | 1.50 | 0.50 | 0.50 | 2.50 | 1.00 |
| $Na_2O$ | 8.50 | 8.50 | 8.50 | 8.50 | 12.50 | 11.00 | 8.00 | 12.50 |
| $K_2O$ | 0.00 | 0.00 | 0.00 | 0.00 | 2.00 | 1.50 | 0.00 | 0.00 |
| MgO | 4.00 | 4.00 | 4.00 | 4.00 | 0.00 | 1.50 | 2.00 | 1.50 |
| CaO | 13.00 | 13.00 | 13.00 | 13.00 | 14.00 | 12.00 | 14.50 | 12.00 |
| SrO | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| $ZrO_2$ | 2.00 | 2.00 | 2.00 | 2.00 | 4.00 | 4.50 | 4.00 | 4.00 |
| $TiO_2$ | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 000 | 0.00 |
| $Yb_2O_3$ | 0.00 | 0.00 | 2.00 | 0.00 | 0.00 | 0.00 | 0.00 | 0.00 |
| $La_2O_3$ | 2.00 | 0.00 | 0.00 | 0.00 | 0.00 | 0.00 | 0.00 | 0.00 |
| $Gd_2O_3$ | 0.00 | 2.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 | 0.00 |
| $Ta_2O_5$ | 0.00 | 0.00 | 0.00 | 2.00 | 0.00 | 0.00 | 0.00 | 0.00 |
| Total | 100.00 | 100.00 | 100.00 | 100.00 | 100.00 | 100.00 | 100.00 | 100.00 |
| Glass transition temp. Tg (° C.) | 623 | 625 | 641 | 642 | 616 | 623 | 617 | >600 |

TABLE 4-continued

| | | | | | | | | | |
|---|---|---|---|---|---|---|---|---|---|
| Average coefficient of linear expansion ($\times 10^{-7}/°C.$) (100~300° C.) | | 80 | 81 | 77 | 74 | 98 | 89 | 79 | >75 |
| Young's modulus (GPa) | | 87.7 | 88.4 | 89.0 | 89.2 | 83.1 | 84.0 | 88.4 | 84.4 |
| Specific modulus of elasticity (MNm/kg)) | | 31.3 | 31.1 | 31.0 | 31.2 | 31.1 | 31.5 | 33.1 | 31.8 |
| Specific gravity | | 2.80 | 2.84 | 2.87 | 2.88 | 2.67 | 2.68 | 2.67 | 2.65 |
| Fracture toughness value [$MPa \cdot m^{1/2}$] (Product not strengthened) | Load 9.81N (1000 gf) | 0.70 | 0.70 | 0.73 | 0.75 | 0.63 | 0.69 | 0.69 | 0.69 |
| | Load 4.9N (500 gf) | 0.69 | 0.70 | 0.73 | 0.75 | 0.63 | 0.69 | 0.69 | 0.69 |
| Strengthening conditions | Temp. [° C.] | 450 | 450 | 450 | 450 | 450 | 450 | 450 | 450 |
| | Period [hrs] | 4 | 4 | 4 | 4 | 4 | 4 | 4 | 4 |
| | Molten salt | | | | | | | | |
| | KNO3 [%] | 60 | 60 | 60 | 60 | 60 | 60 | 60 | 60 |
| | NaNO3 [%] | 40 | 40 | 40 | 40 | 40 | 40 | 40 | 40 |
| Fracture toughness value [$MPa \cdot m^{1/2}$] (Product not strengthened) | Load 9.81N (1000 gf) | 1.21 | 1.21 | 1.15 | 1.19 | 1.23 | 1.23 | 1.20 | 1.23 |
| | Load 4.9N (500 gf) | 1.32 | 1.31 | 1.33 | 1.32 | 1.30 | 1.34 | 1.33 | 1.33 |
| Klc (after)/Klc (before) | | 1.728571 | 1.728571 | 1.675342 | 1.586687 | 1.952381 | 1.782609 | 1.73913 | 1.782609 |

(Note)
Each of Klc (before) and Klc (after) means a fracture toughness value before or after chemical strengthening (at a load of 9.81N (1000 gf)).

TABLE 5

| | Component (mole %) | No. 49 | No. 50 | No. 51 | No. 52 |
|---|---|---|---|---|---|
| Glass composition | $SiO_2$ | 64.00 | 63.00 | 64.00 | 64.00 |
| | $Al_2O_3$ | 5.00 | 9.00 | 5.00 | 2.00 |
| | $B_2O_3$ | 0.00 | 0.00 | 0.00 | 0.00 |
| | $Li_2O$ | 1.50 | 1.50 | 3.00 | 1.00 |
| | $Na_2O$ | 8.50 | 8.50 | 4.00 | 6.00 |
| | $K_2O$ | 0.00 | 0.00 | 2.00 | 1.50 |
| | MgO | 0.00 | 0.00 | 3.00 | 4.00 |
| | CaO | 13.00 | 13.00 | 15.00 | 17.00 |
| | SrO | 4.00 | 0.00 | 0.00 | 0.00 |
| | BaO | 0.00 | 2.00 | 0.00 | 0.00 |
| | ZnO | 0.00 | 0.00 | 0.00 | 0.00 |
| | $ZrO_2$ | 4.00 | 3.00 | 4.00 | 4.50 |
| | $TiO_2$ | 0.00 | 0.00 | 0.00 | 0.00 |
| | Total | 100.00 | 100.00 | 100.00 | 100.00 |
| Characteristics | Specific gravity | 2.76 | 2.71 | 2.67 | 2.71 |
| | Grass transition temp. Tg[° C.] | 640 | 659 | 627 | 640 |
| | Average coefficient of linear expansion [$\times 10^{-7}/°C.$] | 81 | 76 | 75 | 74 |
| | Young's modulus [GPa] | 87 | 86 | 89 | 89 |
| | Specific modulus of elasticity [MNm/kg] | 32 | 32 | 33 | 33 |
| Fracture toughness value [$MPa \cdot m^{1/2}$] (Product not strengthened) | Load 9.81N (1000 gf) | 0.72 | 0.73 | 0.73 | 0.68 |
| | Load 4.9N (500 gf) | 0.72 | 0.73 | 0.73 | 0.68 |
| Strengthening conditions | Temp. [° C.] | 450 | 450 | 450 | 450 |
| | Period [hrs] | 4 | 4 | 4 | 4 |
| | Molten salt | | | | |
| | KNO3 [%] | 60 | 60 | 60 | 60 |
| | NaNO3 [%] | 40 | 40 | 40 | 40 |
| Fracture toughness value [$MPa \cdot m^{1/2}$] (Strengthened product) | Load 9.81N (1000 gf) | 1.21 | 1.20 | 0.96 | 0.95 |
| | Load 4.9N (500 gf) | 1.33 | 1.34 | 1.04 | 1.02 |
| Klc (after)/Klc (before) | | 1.68 | 1.64 | 1.32 | 1.40 |

(Note)
Each of Klc (before) and Klc (after) means a fracture toughness value before or after chemical strengthening (at a load of 9.81N (1000 gf)).

As shown in Tables 2 to 5, the glass substrates of Example Nos. 1 to 52 possessed all four characteristics required of a magnetic recording medium substrate in the form of high heat resistance (a high glass transition temperature), high rigidity (a high Young's modulus), a high coefficient of thermal expansion, and high fracture toughness value. Based on the results shown in Tables 2 to 5, the glass substrates of Example Nos. 1 to 52 were confirmed to have a high specific modulus of elasticity capable of withstanding high-speed rotation and a low specific gravity, permitting a reduction in substrate weight. In addition, the glasses employed to prepare glass substrates in the Examples permitted the ready formation of an ion-exchange layer by the chemical strengthening treatment. As a result, they were confirmed to exhibit high fracture toughness values.

The fracture toughness value $K_{1c}$ (before) prior to chemical strengthening of the glass substrates shown in Table 2 was 0.7 MPa·m$^{1/2}$ at a load of 9.81 N (1,000 gf), readily permitted mechanical processing such as polishing. The fracture toughness value $K_{1c}$ (after) when chemical strengthening was conducted under the conditions of No. 5 given in Table 2 was 1.2 MPa·m$^{1/2}$, imparting good impact resistance. That gave a fracture toughness value ratio of $K_{1c}$ (after)/$K_{1c}$ (before) of equal to or greater than 1.5 (1.7). Example Nos. 10 to 50 in Tables 3 to 5 also exhibited ratios of $K_{1c}$ (after)/$K_{1c}$ (before) of equal to or greater than 1.5. Of these, Example Nos. 10 to 13, 15, and 16 in Table 3 and Example Nos. 17, 21, 24 to 27, 32, 34 to 42, and 45 to 48 in Table 4 also had ratios of $K_{1c}$ (after)/$K_{1c}$ (before) of equal to or greater than 1.7.

Based on these results, the present invention was confirmed to yield glasses having the characteristics demanded of magnetic recording medium substrates.

Comparative Example

Next, a glass having a glass transition temperature of 615° C., an average coefficient of linear expansion at 100 to 300° C. of 83×10$^{-7}$/° C., a Young's modulus of 86 GPa, a specific gravity of 2.77, and a specific modulus of elasticity of 31.0 MNm/kg was processed and chemically strengthened to prepare a magnetic disk similar to those in the Examples. The chemical strengthening conditions were identical to those in No. 7 of Table 2. Measurement following chemical strengthening revealed a fracture toughness value (load P=9.81 N (1,000 gf) of 0.8 MPa·m$^{1/2}$ and a fracture toughness value (load P=4.9 N (500 gf)) of 0.8 MPa·m$^{1/2}$.

3. Evaluation of Magnetic Disks (1) Flatness

Generally, a degree of flatness of equal to or lower than 5 μm permits highly reliable recording and reproduction. The degree of flatness (the distance (difference in height) in the vertical direction (direction perpendicular to the surface) of the highest portion and lowest portion of the disk surfaces) of the surfaces of the various magnetic disks formed using the glass substrates of Examples by the above-described methods was measured with a flatness measuring apparatus. All of the magnetic disks had degrees of flatness of equal to or lower than 5 μm. From these results, it can be determined that the glass substrates of Examples did not undergo substantial deformation even when processed at high temperature during the formation of an FePt layer or CoPt layer.

(2) Load/Unload Test

The various magnetic disks formed using the glass substrates of Examples by the above methods were loaded into a 2.5-inch hard disk drive that rotated at a high speed of 10,000 rpm and subjected to a load/unload test ("LUL" hereinafter). The spindle of the spindle motor in the above hard disk drive was made of stainless steel. The durability of all of the magnetic disks exceeded 600,000 cycles. Further, although crash failures and thermal asperity failures will occur during LUL testing with deformation due to a difference in the coefficient of thermal expansion with the spindle material and deflection due to high-speed rotation, such failures did not occur during testing of any of the magnetic disks.

(3) Impact Resistance Testing

Glass substrates for magnetic disks (2.5 inches, sheet thickness 0.8 mm) were prepared. A Model-15D made by Lansmont was employed to conduct impact testing. In the impact testing, the magnetic disk glass substrate was assembled into a dedicated impact testing jig prepared with a spindle and clamp members similar to those of a HDD, an impact in the form of a half sine wave pulse of 1,500 G was applied perpendicularly for 1 msec to the main surface, and the damage to the magnetic disk glass substrate was observed.

As a result, no damage was observed in the glass substrates of the Examples. By contrast, damage was observed in the glass substrate of the comparative example. A detailed examination of the portion in which the damage occurred revealed that most was present in the inner diameter portion of the disk.

Based on the above results, the present invention was confirmed to yield a glass substrate for a magnetic recording medium that afforded excellent impact resistance and permitted recording and reproduction with high reliability.

A glass disk prepared by the above method using the glass substrate of Examples was loaded into the hard disk drive of a recording mode in which magnetization reversal was assisted by irradiating the magnetic disk with a laser beam (heat-assisted recording method) and a magnetic recording medium of the heat-assisted recording type was prepared. The magnetic recording apparatus contained a heat-assisted magnetic recording head with a heat source (laser beam source) heating the main surface of a magnetic recording medium (magnetic disk), a recording element and a reproduction element, and a magnetic disk. The magnetic head of the magnetic recording apparatus was a DFH (dynamic flying height) head and the rotational speed of the magnetic disk was 10,000 rpm.

A separately prepared magnetic disk was loaded into a hard disk drive employing a recording mode assisted by microwaves (microwave-assisted recording mode) and a microwave-assisted recording mode information recording apparatus was prepared. Such information recording apparatuses, combining a high Ku magnetic material and energy-assisted recording, permitted high-density recording in the manner set forth above.

The present invention can provide a magnetic recording medium that is optimal for achieving higher density recording.

What is claimed is:

1. A glass substrate for a magnetic recording medium, which is comprised of glass comprising $K_2O$ within a range of 0 to 1 mole percent and having:
   a glass transition temperature of equal to or greater than 600° C.,
   an average coefficient of linear expansion at 100 to 300° C. of equal to or greater than 70×10-7/° C.,
   a Young's modulus of equal to or greater than 81 GPa,
   a specific modulus of elasticity of equal to or greater than 30 MNm/kg, and
   a fracture toughness value of equal to or greater than 0.9 MPa m½,
   wherein the glass further comprises $Li_2O$ and $Na_2O$ and has a molar ratio {$K_2O/(Li_2O+Na_2O+K_2O)$} of the $K_2O$ content to the total content of the alkali metal oxides is equal to or lower than 0.13.

2. The glass substrate for a magnetic recording medium according to claim 1, the sheet thickness of which is equal to or greater than 0.8 mm.

3. The glass substrate for a magnetic recording medium according to claim 1, which is a glass substrate for a magnetic recording medium employed in a magnetic recording apparatus in which a rotational speed is equal to or higher than 7200 rpm.

4. The glass substrate for a magnetic recording medium according to claim 1, wherein the glass has been subjected to chemical strengthening.

5. The glass substrate for a magnetic recording medium according to claim 4, wherein the chemical strengthening has been conducted with the use of melt of potassium nitrate and/or sodium nitrate.

6. The glass substrate for a magnetic recording medium according to claim 1, which is a glass substrate for a magnetic recording medium employed in a magnetic recording apparatus equipped with a dynamic flying height head.

7. The glass substrate for a magnetic recording medium according to claim 1, which is employed in a magnetic recording medium for energy-assisted magnetic recording.

8. The glass substrate for a magnetic recording medium according to claim 1, wherein an arithmetic average roughness, Ra, measured by an atomic force microscope at a resolution of 512×256 pixels over an area of 1 μm×1 μm on a main surface of the substrate is equal to or lower than 0.15 nm.

9. A magnetic recording medium, which comprises a magnetic recording layer on the glass substrate for a magnetic recording medium according to claim 1.

10. The magnetic recording medium according to claim 9, wherein the magnetic recording layer comprises a magnetic material the main component of which is alloy of Pt with Fe and/or Co, and the magnetic recording medium is a magnetic recording medium for energy-assisted magnetic recording.

11. A magnetic recording apparatus of energy-assisted magnetic recording system, which comprises:
a heat-assisted magnetic recording head comprising a heat source heating at least a main surface of a magnetic recording medium, a recording element, and a reproduction element; and
a magnetic recording medium according to claim 9.

12. A glass substrate blank for a magnetic recording medium, which is comprised of glass comprising $K_2O$ within a range of 0 to 1 mole percent and having:
a glass transition temperature of equal to or greater than 600° C.,
an average coefficient of linear expansion at 100 to 300° C. of equal to or greater than 70×10−7/° C.,
a Young's modulus of equal to or greater than 81 GPa,
a specific modulus of elasticity of equal to or greater than 30 MNm/kg, and
a fracture toughness value of equal to or greater than 0.9 MPa m½.

13. The glass substrate for a magnetic recording medium according to claim 1, wherein the glass substrate contains $SiO_2$, $Al_2O_3$ and one or more of alkali metal oxides $R_2O$, where R denotes Li, Na, or K.

14. A glass substrate for a magnetic recording medium, which is comprised of glass having:
a glass transition temperature of equal to or greater than 600° C.,
an average coefficient of linear expansion at 100 to 300° C. of equal to or greater than 70×10−7/° C.,
a Young's modulus of equal to or greater than 81 GPa,
a specific modulus of elasticity of equal to or greater than 30 MNm/kg, and
a fracture toughness value of equal to or greater than 0.9 MPa m½,
wherein (1) the glass substrate contains $SiO_2$, $Al_2O_3$ and one or more of alkali metal oxide $R_2O$ where R denotes Li, Na, or K and (2) the molar ratio {$K_2O/(Li_2O+Na_2O+K_2O)$} of the $K_2O$ content to the total content of the alkali metal oxides is equal to or lower than 0.13.

15. The glass substrate for a magnetic recording medium according to claim 14, the sheet thickness of which is equal to or greater than 0.8 mm.

16. The glass substrate for a magnetic recording medium according to claim 14, which is a glass substrate for a magnetic recording medium employed in a magnetic recording apparatus in which a rotational speed is equal to or higher than 7200 rpm.

17. The glass substrate for a magnetic recording medium according to claim 14, wherein a content of $K_2O$ in the glass is less than 3 mol percent.

18. The glass substrate for a magnetic recording medium according to claim 14, wherein the glass has been subjected to chemical strengthening.

19. The glass substrate for a magnetic recording medium according to claim 18, wherein the chemical strengthening has been conducted with the use of melt of potassium nitrate and/or sodium nitrate.

20. The glass substrate for a magnetic recording medium according to claim 14, which is a glass substrate for a magnetic recording medium employed in a magnetic recording apparatus equipped with a dynamic flying height head.

21. The glass substrate for a magnetic recording medium according to claim 14, which is employed in a magnetic recording medium for energy-assisted magnetic recording.

22. The glass substrate for a magnetic recording medium according to claim 14, wherein an arithmetic average roughness, Ra, measured by an atomic force microscope at a resolution of 512×256 pixels over an area of 1 μm×1 μm on a main surface of the substrate is equal to or lower than 0.15 nm.

23. A magnetic recording medium, which comprises a magnetic recording layer on the glass substrate for a magnetic recording medium according to claim 14.

24. The magnetic recording medium according to claim 23, wherein the magnetic recording layer comprises a magnetic material the main component of which is alloy of Pt with Fe and/or Co, and the magnetic recording medium is a magnetic recording medium for energy-assisted magnetic recording.

25. A glass substrate blank for a magnetic recording medium, comprising glass having:
a glass transition temperature of equal to or greater than 600° C.,
an average coefficient of linear expansion at 100 to 300° C. of equal to or greater than 70×10−7/° C.,
a Young's modulus of equal to or greater than 81 GPa,
a specific modulus of elasticity of equal to or greater than 30 MNm/kg, and
a fracture toughness value of equal to or greater than 0.9 MPa m½,
wherein (1) the glass substrate contains $SiO_2$, $Al_2O_3$ and one or more of alkali metal oxide $R_2O$ where R denotes Li, Na, or K and (2) the molar ratio {$K_2O/(Li_2O+Na_2O+K_2O)$} of the $K_2O$ content to the total content of the alkali metal oxides is equal to or lower than 0.13.

* * * * *